(12) United States Patent
Tomita et al.

(10) Patent No.: US 12,460,048 B2
(45) Date of Patent: Nov. 4, 2025

(54) THERMOPLASTIC RESIN COMPOSITION AND FORMED PRODUCT

(71) Applicant: MITSUBISHI CHEMICAL CORPORATION, Tokyo (JP)

(72) Inventors: Shohei Tomita, Tokyo (JP); Masashi Yokogi, Tokyo (JP); Hiroki Shibata, Tokyo (JP); Masaya Yamashita, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 750 days.

(21) Appl. No.: 17/682,008

(22) Filed: Feb. 28, 2022

(65) Prior Publication Data

US 2022/0195114 A1 Jun. 23, 2022

Related U.S. Application Data

(63) Continuation of application No. PCT/JP2020/032639, filed on Aug. 28, 2020.

(30) Foreign Application Priority Data

| Aug. 29, 2019 | (JP) | 2019-157059 |
| Jun. 11, 2020 | (JP) | 2020-101649 |
| Jul. 17, 2020 | (JP) | 2020-122968 |

(51) Int. Cl.
*C08G 64/06* (2006.01)
(52) U.S. Cl.
CPC .................. *C08G 64/06* (2013.01)
(58) Field of Classification Search
CPC ...... C08G 64/06; C08G 61/02; C08G 61/127; C08G 67/00; C08L 73/00; C09D 173/00; G02B 5/30; G02F 1/1333; G02F 1/133528
See application file for complete search history.

(56) References Cited

U.S. PATENT DOCUMENTS

| 3,890,266 A | 6/1975 | Serini et al. |
| 2021/0147622 A1 | 5/2021 | Monden et al. |

FOREIGN PATENT DOCUMENTS

| JP | 49-73455 A | 7/1974 |
| JP | S64-69625 A | 3/1989 |
| JP | 04-4222 A | 1/1992 |
| JP | H10-176046 A | 6/1998 |
| JP | H11-100341 A | 4/1999 |
| JP | 2006008759 A | 1/2006 |
| JP | 2011071881 A | 4/2011 |
| JP | 2013102512 A | 5/2013 |
| JP | 2019197048 A | 11/2019 |
| KR | 20150078280 A | 7/2015 |
| WO | WO-2019212020 A1 | 11/2019 |

OTHER PUBLICATIONS

Combined Chinese Office Action and Search Report issued Apr. 4, 2023 in Patent Application No. 202080060623.1 (with partial English translation), 12 pages.
Office Action issued Mar. 22, 2024 in corresponding Korean Patent Application No. 10-2022-7006677 (with machine English translation), 31 pages.
Extended European Search Report issued Jul. 13, 2022 in Patent Application No. 20858320.3, 7 pages.
Office Action issued Jan. 20, 2024 in corresponding Chinese Patent Application No. 202080060623.1 (with machine English translation), 10 pages.
Office Action issued Aug. 23, 2023 in Chinese Patent Application No. 202080060623.1 (with English translation), 10 pages.

(Continued)

*Primary Examiner* — Shane Fang
(74) *Attorney, Agent, or Firm* — Element IP, PLC

(57) ABSTRACT

A formed product produced by using a thermoplastic resin composition comprising a polycarbonate resin with a repeating unit (A) represented by the following general formula (1) and a repeating unit (B) represented by the following general formula (2). $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group. X denotes a single bond or a divalent organic group represented by the following general formula (3). $R^6$ to $R^9$ independently denote a substituted or unsubstituted alkyl group having 1 to 20 carbon atoms or a substituted or unsubstituted aryl group. $R^5$ denotes a hydrogen atom, a substituted or unsubstituted alkyl group having 1 to 20 carbon atoms, or a substituted or unsubstituted aryl group.

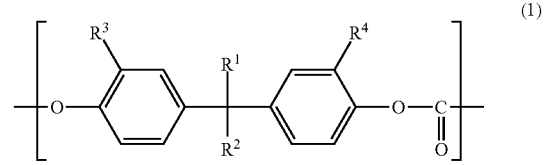

(1)

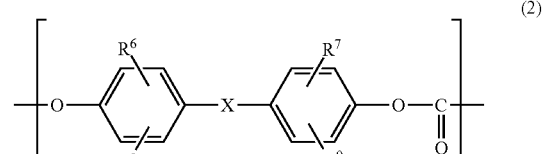

(2)

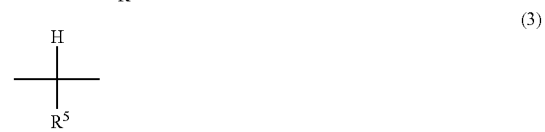

(3)

32 Claims, No Drawings

(56) References Cited

OTHER PUBLICATIONS

International Search Report and Written Opinion issued Nov. 2, 2020 in PCT/JP2020/032639 (with English translation of Search Report), 13 pages.

Office Action issued Aug. 6, 2024 in corresponding Japanese Patent Application No. 2021-543046 (with machine English translation), 8 pages.

Final Office Action issued Nov. 25, 2024, in corresponding Korean Patent Application No. 10-2022-7006677 (with machine English translation), 10 pages.

THERMOPLASTIC RESIN COMPOSITION AND FORMED PRODUCT

TECHNICAL FIELD

The present invention relates to a thermoplastic resin composition with high microwave and/or millimeter-wave band transmission, heat resistance, and flame retardancy, a formed product of the thermoplastic resin composition, and a housing for a communication device with a built-in microwave and/or millimeter-wave antenna. The present invention also relates to a communication device including the housing for a communication device.

BACKGROUND ART

Polycarbonate resins have high mechanical strength, good electrical characteristics, and high transparency and are widely used as engineering plastics in various fields, such as electrical and electronic devices and automobiles.

Patent Literature 1 proposes a millimeter-wave radar cover in which a polycarbonate resin composed of a bisphenol with a specific substituent as a raw material is used to decrease dielectric loss tangent and improve millimeter-wave transmission in the range of 75 to 81 GHz.

Patent Literature 2 discloses a polycarbonate composition and a copolycarbonate with high heat resistance and fire resistance produced using two specific bisphenols as raw materials.

Patent Literature 3 discloses a polycarbonate with high surface hardness produced using a bisphenol different from known bisphenol A as a raw material.

PTL 1: JP 2019-197048A
PTL 2: JP 49-73455A
PTL 3: JP 64-69625A

In recent years, radio waves in high-frequency bands, such as microwaves and millimeter-waves, are used in the fields of electrical and electronic devices and automobiles. Thus, there is a need for a material with both a low relative dielectric constant and a low dielectric loss tangent.

In particular, in the electrical and electronic fields, there is a need for high heat resistance and flame retardancy in addition to a low relative dielectric constant and a low dielectric loss tangent.

However, known polycarbonate resins produced using bisphenol A as a raw material cannot sufficiently satisfy these needs.

In recent years, with an increase in information traffic, there has been a strong demand for information communication devices, such as notebook computers, tablet devices, smartphones, and routers, with a higher communication speed. For high-speed communication, it is preferable to use a radio wave in a higher frequency band. Recently, radio waves above 3 GHz classified into microwave bands have been used. In the next fifth-generation mobile communication system (5G), a market in a microwave band of a higher 28 GHz band is expected to evolve. In the further next-generation communication, radio waves in the millimeter-wave band may be used.

Thus, there is also an increasing demand for higher-performance housings of information communication devices that may be used in microwave and/or millimeter-wave bands. Radio waves in such high-frequency bands characteristically have a higher transmission loss and lower substance permeability than radio waves in lower-frequency bands. It is therefore desirable that housings for microwave and/or millimeter-wave communication have higher radio wave transmission than known housings.

The transmission loss is proportional to the square root of the relative dielectric constant ($\varepsilon_r$) of a dielectric material and to the dielectric loss tangent (tan $\delta$) of the dielectric material. To increase the radio wave transmission of housings, therefore, it is necessary to reduce the relative dielectric constant $\varepsilon_r$ and the dielectric loss tangent tan $\delta$ of materials for the housings.

Information communication devices for transmission and reception of radio waves in high-frequency bands, such as microwaves and/or millimeter-waves, characteristically easily generate heat. It is therefore desirable that materials for use in such a field not only have a low relative dielectric constant and a low dielectric loss tangent but also have moderate heat resistance and flame retardancy. Thus, there is a strong need for a material satisfying these conditions.

However, known materials cannot satisfy all of such requirements.

Patent Literature 1 proposes a millimeter-wave radar cover in which a thermoplastic resin composition containing a polycarbonate resin composed of a bisphenol with a specific substituent as a raw material is used to decrease dielectric loss tangent and improve millimeter-wave transmission. However, such a thermoplastic resin composition has insufficient heat resistance and flame retardancy for use in information communication devices, such as notebook computers, tablet devices, smartphones, and routers.

Patent Literature 2 discloses a polycarbonate copolymer with improved heat resistance and fire resistance but does not describe dielectric properties.

On the other hand, in the application fields of engineering plastics, such as electrical and electronic devices and automobiles, thinner, smaller, and lighter formed products have been developed, and there is a need for forming materials with further improved performance.

However, known polycarbonate resins composed of bisphenol A as a raw material have insufficient surface hardness and alkali resistance for these required characteristics. Thus, there is a need for a polycarbonate resin with high surface hardness and alkali resistance, and several proposals have been made.

Patent Literature 2 discloses a polycarbonate composition and a copolycarbonate with high alkali resistance produced using two specific bisphenols as raw materials.

Patent Literature 3 discloses a polycarbonate with high surface hardness produced using a bisphenol different from known bisphenol A as a raw material.

However, polycarbonate resin compositions with high surface hardness and alkali resistance as well as high heat resistance and impact resistance cannot be produced by known methods.

SUMMARY OF INVENTION

A first aspect of the present invention aims to provide a thermoplastic resin composition and a formed product with high microwave and/or millimeter-wave band transmission, heat resistance, and flame retardancy, and a housing for a communication device and a communication device with a built-in microwave and/or millimeter-wave antenna.

The present inventors have found that a thermoplastic resin composition containing a polycarbonate resin with two specific repeating units, a formed product of the thermoplastic resin composition, and a housing for a communication device with a built-in microwave and/or millimeter-wave antenna containing the thermoplastic resin composition can provide a housing for a communication device with a built-in microwave and/or millimeter-wave antenna meeting such an object.

The gist of the first aspect of the present invention consists in the following [1] to [32].

[1] A thermoplastic resin composition comprising a polycarbonate resin with a repeating unit (A) represented by the following general formula (1) and a repeating unit (B') represented by the following general formula (2').

[Chem. 1]

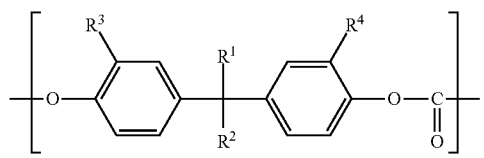

(1)

In the general formula (1), $R^1$ and $R^2$ independently denote a hydrogen atom, a substituted or unsubstituted alkyl group having 1 to 20 carbon atoms, or a substituted or unsubstituted aryl group, the alkyl groups in $R^1$ and $R^2$ may be bonded together to form a ring, and $R^3$ and $R^4$ independently denote a substituted or unsubstituted alkyl group having 1 to 20 carbon atoms or a substituted or unsubstituted aryl group.

[Chem. 2]

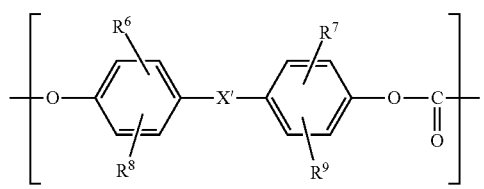

(2')

In the general formula (2'), X' denotes a single bond or a methylene group, and $R^6$ to $R^9$ independently denote a substituted or unsubstituted alkyl group having 1 to 20 carbon atoms or a substituted or unsubstituted aryl group.

[2] The thermoplastic resin composition according to [1], wherein $R^1$ and $R^2$ in the general formula (1) independently denote a methyl group, or the alkyl groups in $R^1$ and $R^2$ are bonded together to form a ring represented by the following formula (1a) or (1b).

[Chem. 3]

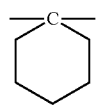

(1a)

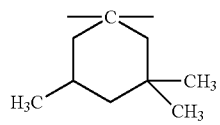

(1b)

[3] The thermoplastic resin composition according to [1] or [2], wherein $R^3$ and $R^4$ in the general formula (1) independently denote a methyl group.

[4] The thermoplastic resin composition according to any one of [1] to [3], wherein the repeating unit (B') is a repeating unit represented by the following general formula (2A').

[Chem. 4]

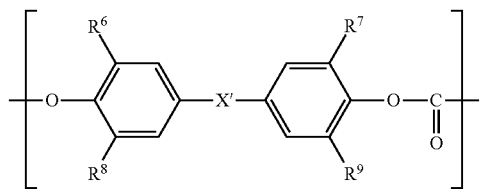

(2A')

X' and $R^6$ to $R^9$ in the general formula (2A') have the same meaning as in the general formula (2').

[5] The thermoplastic resin composition according to any one of [1] to [4], wherein the repeating unit (B') is a repeating unit represented by the following general formula (2B').

[Chem. 5]

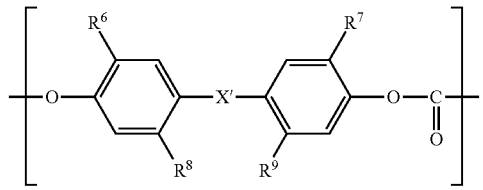

(2B')

X' and $R^6$ to $R^9$ in the general formula (2B') have the same meaning as in the general formula (2').

[6] The thermoplastic resin composition according to any one of [1] to [5], wherein $R^6$ to $R^9$ in the general formula (2') independently denote a methyl group.

[7] The thermoplastic resin composition according to any one of [1] to [6], wherein the repeating unit (A) and the repeating unit (B') in the polycarbonate resin have a repeating unit (A):repeating unit (B') ratio in the range of 1:99 to 99:1 on a molar basis.

[8] The thermoplastic resin composition according to any one of [1] to [7], wherein a sum of the repeating unit (A) and the repeating unit (B') in the polycarbonate resin constitutes 50% or more by mole of a total carbonate structural unit of the polycarbonate resin.

[9] The thermoplastic resin composition according to any one of [1] to [8], wherein the polycarbonate resin has a glass transition temperature of 125° C. or more.

[10] The thermoplastic resin composition according to any one of [1] to [9], wherein the thermoplastic resin composition contains 50% or more by mass of the polycarbonate resin.

[11] The thermoplastic resin composition according to any one of [1] to [10], comprising the polycarbonate resin as a copolymerized polycarbonate resin of the repeating unit (A) and the repeating unit (B').

[12] The thermoplastic resin composition according to any one of [1] to [10], comprising the polycarbonate resin as a blend of a polycarbonate resin with the repeating unit (A) and a polycarbonate resin with the repeating unit (B').

[13] The thermoplastic resin composition according to any one of [1] to [12], wherein the polycarbonate resin has a viscosity-average molecular weight (Mv) in the range of 14,500 to 30,000.

[14] The thermoplastic resin composition according to [13], wherein the polycarbonate resin has a viscosity-average molecular weight (Mv) in the range of 18,000 to 28,000.

[15] The thermoplastic resin composition according to any one of [1] to [14], wherein pencil hardness measured by a method according to ISO 15184 is H or higher.

[16] A formed product produced by using a thermoplastic resin composition comprising a polycarbonate resin with a repeating unit (A) represented by the following general formula (1) and a repeating unit (B) represented by the following general formula (2).

[Chem. 6]

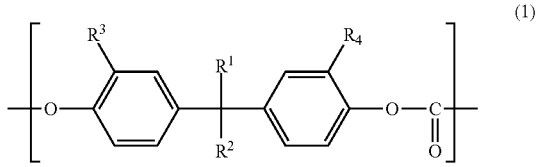

(1)

In the general formula (1), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 7]

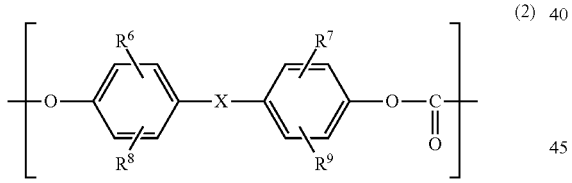

(2)

In the general formula (2), X denotes a singe bond or a divalent organic group represented by the following general formula (3). $R^6$ to $R^9$ independently denote a substituted or unsubstituted alkyl group having 1 to 20 carbon atoms or a substituted or unsubstituted aryl group.

[Chem. 8]

(3)

In the general formula (3), $R^5$ denotes a hydrogen atom, a substituted or unsubstituted alkyl group having 1 to 20 carbon atoms, or a substituted or unsubstituted aryl group.

[17] The formed product according to [16], wherein $R^1$ and $R^2$ in the general formula (1) independently denote a methyl group, or the alkyl groups in $R^1$ and $R^2$ are bonded together to form a ring represented by the following formula (1a) or (1b).

[Chem. 9]

(1a)

(1b)

[18] The formed product according to [16] or [17], wherein $R^3$ and $R^4$ in the general formula (1) independently denote a methyl group.

[19] The formed product according to any one of [16] to [18], wherein the repeating unit (B) is a repeating unit represented by the following general formula (2A),

[Chem. 10]

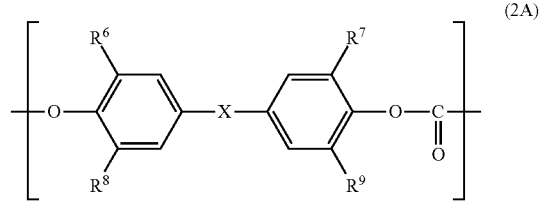

(2A)

X and $R^6$ to $R^9$ in the general formula (2A) have the same meaning as in the general formula (2).

[20] The formed product according to any one of [16] to [19], wherein the repeating unit (B) is a repeating unit represented by the following general formula (2B),

[Chem. 11]

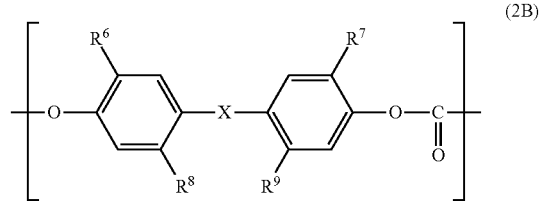

(2B)

X and $R^6$ to $R^9$ in the general formula (2B) have the same meaning as in the general formula (2).

[21] The formed product according to any one of [16] to [20], wherein $R^6$ to $R^9$ in the general formula (2) independently denote a methyl group.

[22] The formed product according to any one of [16] to [21], wherein $R^5$ in the general formula (3) denotes a hydrogen atom or a methyl group.

[23] The formed product according to any one of [16] to [22], wherein the repeating unit (A) and the repeating unit (B) in the polycarbonate resin have a repeating unit (A):repeating unit (B) ratio in the range of 1:99 to 99:1 on a molar basis.

[24] The formed product according to any one of [16] to [23], wherein a sum of the repeating unit (A) and the repeating unit (B) in the polycarbonate resin constitutes 50% or more by mole of a total carbonate structural unit of the polycarbonate resin.

[25] The formed product according to any one of [16] to [24], wherein the polycarbonate resin has a glass transition temperature of 125° C. or more.

[26] The formed product according to any one of [16] to [25], wherein the thermoplastic resin composition contains 50% or more by mass of the polycarbonate resin.

[27] The formed product according to any one [16] to [26], wherein the formed product is an extrudate or an injection-molded product.

[28] The formed product according to [27], wherein the extrudate is a sheet or film.

[29] A housing for a communication device with a built-in microwave and/or millimeter-wave antenna, produced by using the formed product according to any one of [16] to [28].

[30] The housing for a communication device according to [29], wherein the antenna is used for a radio wave in a

[31] The housing for a communication device according to [29] or [30], wherein the communication device is a notebook computer, a tablet device, a smartphone, or a router.

[32] A communication device with a built-in microwave and/or millimeter-wave antenna, produced by using the housing for a communication device according to any one of [29] to [31].

A second aspect of the present invention aims to provide a polycarbonate resin composition with high hardness and alkali resistance as well as high heat resistance and impact resistance.

The present inventors have found that a polycarbonate resin composition with a carbonate structural unit derived from two specific aromatic dihydroxy compounds can be a polycarbonate resin composition meeting such an object.

The gist of the second aspect of the present invention consists in the following [33] to [44].

[33] A polycarbonate resin composition comprising a carbonate structural unit (X) derive, from an aromatic dihydroxy compound represented by the following formula (11) and a carbonate structural unit (Y) derived from an aromatic dihydroxy compound represented by the following formula (12) at a mole ratio (X)/(Y) in the range of 1/99 to 99/1.

[Chem. 12]

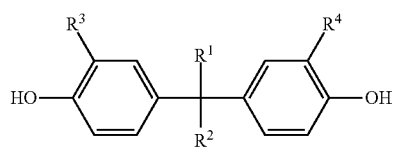

(11)

In the general formula (11), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 13]

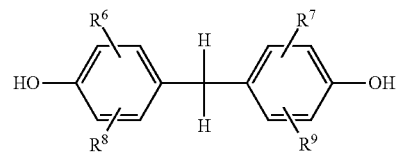

(12)

In the general formula (12), $R^6$ to $R^9$ independently denote a substituted or unsubstituted alkyl group having 1 to 20 carbon atoms or a substituted or unsubstituted aryl group.

[34] The polycarbonate resin composition according to [33], wherein the polycarbonate resin composition comprises the carbonate structural unit (X) and the carbonate structural unit (Y) as a copolymerized polycarbonate resin.

[35] The polycarbonate resin composition according to [33], wherein the polycarbonate resin composition is a mixture of a polycarbonate resin comprising the carbonate structural unit (X) and a polycarbonate resin comprising the carbonate structural unit (Y).

[36] The polycarbonate resin composition according to any one of [33] to [35], wherein the polycarbonate resin composition has a viscosity-average molecular weight (Mv) in the range of 15,000 to 33,000.

[37] The polycarbonate resin composition according to any one of [33] to [36], wherein the polycarbonate resin composition has a pencil hardness of H or higher as measured by the method according to ISO 15184.

[38] The polycarbonate resin composition according to any one of [33] to [37], wherein the polycarbonate resin composition has a glass transition temperature Tg in the range of 130° C. to 200° C.

[39] The polycarbonate resin composition according to any one of [33] to [38], wherein the carbonate structural unit (X) is a carbonate structural unit derived from an aromatic dihydroxy compound represented by following general formula (13).

[Chem. 14]

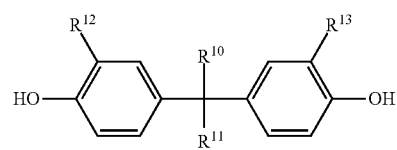

(13)

In the general formula (13), $R^{10}$ and $R^{11}$ independently denote a hydrogen atom or a methyl group. $R^{12}$ and $R^{13}$ independently denote a methyl group or an ethyl group.

[40] The polycarbonate resin composition according to any one of [33] to [39], wherein the carbonate structural unit (Y) is a carbonate structural unit derived from an aromatic dihydroxy compound represented by the following general formula (14).

[Chem. 15]

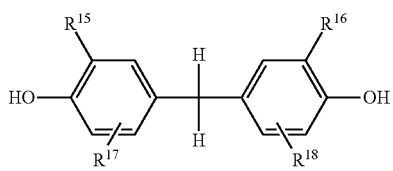

(14)

In the general formula (14), $R^{15}$ to $R^{18}$ independently, denote a methyl group or an ethyl group.

[41] The polycarbonate resin composition according to [40], wherein the carbonate structural unit (Y) is derived from an aromatic dihydroxy compound represented by the following general formula (14A).

[Chem. 16]

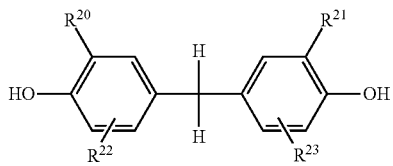

(14A)

In the general formula (14A), $R^{20}$ to $R^{23}$ independently denote a methyl group or an ethyl group.

[42] An injection-molded product produced by injection molding the polycarbonate resin composition according to any one of [33] to [41].

[43] An extrudate produced by extruding the polycarbonate resin composition according to any one of [33] to [03419].

[44] The extrudate according to [43], wherein the extrudate is a sheet or film.

A third aspect of the present invention aims to provide a polycarbonate resin composition with high surface hardness and alkali resistance as well as high heat resistance, impact resistance, and fluidity.

The present inventors have found that a polycarbonate resin composition with a carbonate structural unit derived from two specific aromatic dihydroxy compounds can be a polycarbonate resin composition meeting such an object.

The gist of the third aspect of the present invention consists in the following [45] to [59].

[45] A polycarbonate resin composition comprising a carbonate structural unit (X) derived from an aromatic dihydroxy compound represented by the following general formula (11) and a carbonate structural unit (Z) derived from an aromatic dihydroxy compound represented by the following general formula (21) at a mole ratio of the carbonate structural unit (X)/carbonate structural unit (Z) in the range of 1/99 to 99/1.

[Chem. 17]

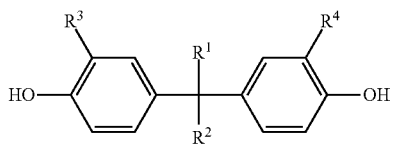

(11)

In the general formula (11), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 18]

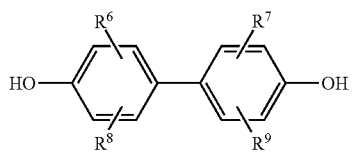

(21)

In the general formula (21), $R^6$ to $R^9$ independently denote a substituted or unsubstituted alkyl group having 1 to 20 carbon atoms or a substituted or an aryl group.

[46] The polycarbonate resin composition according to [45], wherein the polycarbonate resin composition comprises the carbonate structural unit (X) and the carbonate structural unit (Z) as a copolymerized polycarbonate resin.

[47] The polycarbonate resin composition according to [45], wherein the polycarbonate resin composition is a mixture of a polycarbonate resin comprising the carbonate structural unit (X) and a polycarbonate resin comprising the carbonate structural unit (Z).

[48] The polycarbonate resin composition according to any one of [45] to [47], wherein the polycarbonate resin in the polycarbonate resin composition has a viscosity-average molecular weight (Mv) in the range of 16,000 to 30,000.

[49] The polycarbonate resin composition according to any one of [45] to [48], wherein the polycarbonate resin composition has a pencil hardness or higher as measured by the method according to ISO 15184.

[50] The polycarbonate resin composition according to any one of [45] to [49], wherein the polycarbonate resin composition has a glass transition temperature Tg in the range of 130° C. to 200° C.

[51] The polycarbonate resin composition according to any one of [45] to [50], wherein the polycarbonate resin in the polycarbonate resin composition has a viscosity-average molecular weight (Mv) in the range of 18,000 to 28,000.

[52] The polycarbonate resin composition according to any one of [45] to [51], wherein the polycarbonate resin composition comprises the carbonate structural unit (X) and the carbonate structural unit (Z) at a mole ratio (X)/(Z) in the range of 1/99 to 85/15.

[53] The polycarbonate resin composition according to any one of [45] to [52], wherein the carbonate structural unit (X) is a carbonate structural unit derived from an aromatic dihydroxy compound represented by the following general formula (13).

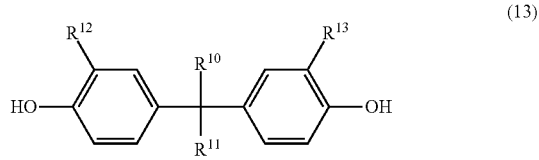

(13)

In the general formula (13), $R^{10}$ and $R^{11}$ independently denote a hydrogen atom or a methyl group. $R^{12}$ and $R^{13}$ independently denote a methyl group or an ethyl group.

[54] The polycarbonate resin composition according to any one of [45] to [53], wherein the carbonate structural unit (Z) is a carbonate structural unit derived from aromatic dihydroxy compound represented by the following general formula (22).

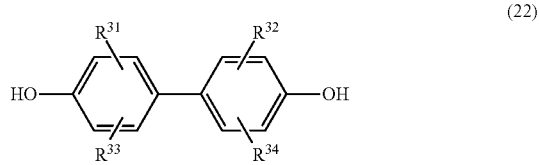

(22)

In the general formula (22), $R^{31}$ to $R^{34}$ independently denote a methyl group or an ethyl group.

[55] The polycarbonate resin composition according to [54], wherein the carbonate structural unit (Z) is a carbonate structural unit derived from aromatic dihydroxy compound represented by the following general formula (22A).

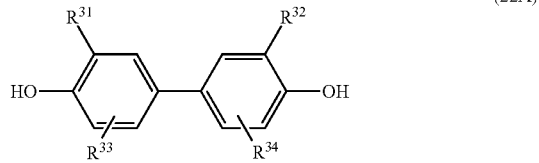

(22A)

In the general formula (22A), $R^{31}$ to $R^{34}$ have the same meaning as in the general formula (22).

[56] A molded product obtained from the polycarbonate resin composition according to any one of [45] to [55].
[57] An injection-molded product produced using the polycarbonate resin composition according to any one of [45] to [55].
[58] An extrudate produced using the polycarbonate resin composition according to any one of [45] to [55].
[59] The extrudate according to [58], wherein the extrudate is a sheet or film.

Advantageous Effects of Invention

The formed product and the housing for a communication device with a built-in microwave and/or millimeter-wave antenna according to the first aspect of the present invention have high microwave and/or millimeter-wave band transmission as well as high heat resistance and flame retardancy and can therefore be widely used as a housing for a communication device with a built-in microwave and/or millimeter-wave antenna, for example, a notebook computer, a tablet device, a smartphone, or a router. Furthermore, it is possible to provide a formed product also with high impact resistance and a housing for a communication device with a built-in microwave and/or millimeter-wave antenna.

The second aspect of the present invention can provide a polycarbonate resin composition with high hardness and alkali resistance as well as high heat resistance and mechanical strength, such as impact resistance.

The third aspect of the present invention can provide a polycarbonate resin composition with high surface hardness and alkali resistance as well as high heat resistance, impact resistance, and fluidity.

The polycarbonate resin compositions according to the second and third aspects of the present invention have such good characteristics and therefore can be widely used as materials to produce parts in automobiles, electrical and electronic devices, and other industrial fields.

DESCRIPTION OF EMBODIMENTS

The present invention is described in detail in the following embodiments and examples. The present invention is not limited to these embodiments and examples.

In the present specification, unless otherwise specified, numerical values before and after "to" mean that these values are included as a lower limit and an upper limit.

The first aspect of the present invention may be referred to as a "first invention", the second aspect may be referred to as a "second invention", and the third aspect may be referred to as a "third invention", and these may be collectively referred to as "the present invention".

First Invention

[Outline]

As described above, the formed product and the housing for a communication device with a built-in microwave and/or millimeter-wave antenna according to the first invention are characterized by being produced from a thermoplastic resin composition (hereinafter sometimes referred to as a "thermoplastic resin composition according to the present invention") containing a polycarbonate resin with a repeating unit (A) represented by the general formula (1) and a repeating unit (B') represented by the general formula (2') or a repeating unit (B) represented by the general formula (2) (hereinafter sometimes referred to as a "polycarbonate resin according to the first invention").

A communication device according to the present invention is a communication device with a built-in microwave and/or millimeter-wave antenna produced by using the housing for a communication device.

Components and the like constituting the polycarbonate resin according to the first invention and the thermoplastic resin composition according to the first invention containing the polycarbonate resin according to the first invention are described in detail below.

[Polycarbonate Resin]

The polycarbonate resin according to the first invention is characterized by having a repeating unit (A) represented by the following general formula (1) and a repeating unit (B') represented by the following general formula (2') or a repeating unit (B) represented by the following general formula (2).

The use of the thermoplastic resin composition containing the polycarbonate resin according to the first invention with the repeating unit (A) represented by the following general formula (1) and the repeating unit (B') represented by the following general formula (2') or the repeating unit (B) represented by the following general formula (2) can improve the microwave and/or millimeter-wave band transmission, heat resistance, and flame retardancy of the formed product and the housing for a communication device according to the first invention.

The "repeating unit (B') or repeating unit (B)" may be hereinafter referred to as the "repeating unit (B') or (B)".

[Chem. 22]

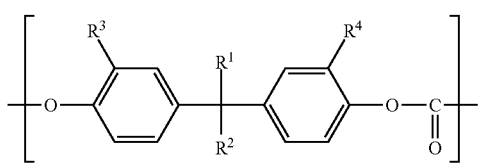
(1)

In the general formula (1), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 23]

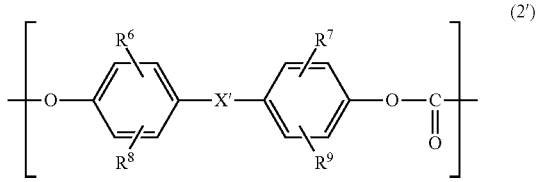
(2')

In the general formula (2'), X' denotes a single bond or a methylene group, and $R^6$ to $R^9$ independently denote a substituted or unsubstituted alkyl group having 1 to 20 carbon atoms or a substituted or unsubstituted aryl group.

[Chem. 24]

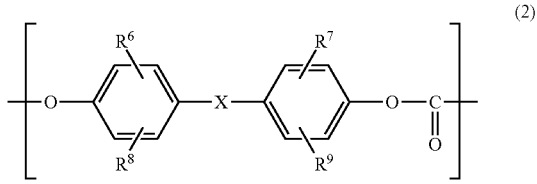
(2)

In the general formula (2), X denotes a single bond or a divalent organic group represented by the following general formula (3). $R^6$ to $R^9$ independently denote a substituted or unsubstituted alkyl group having 1 to 20 carbon atoms or a substituted or unsubstituted aryl group.

[Chem. 25]

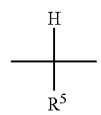
(3)

In the general formula (3), $R^5$ denotes a hydrogen atom, a substituted or unsubstituted alkyl group having 1 to 20 carbon atoms, or a substituted or unsubstituted aryl group.

The polycarbonate resin according to the first invention may be a polycarbonate resin mixture of a polycarbonate resin with the repeating unit (A) and a polycarbonate resin with the repeating unit (B') or (B) or may be a copolymerized polycarbonate resin with the repeating unit (A) and the repeating unit (B') or (B). Alternatively, the polycarbonate resin according to the first invention may be a polycarbonate resin mixture containing the polycarbonate resin with the repeating unit (A) and/or the polycarbonate resin with the repeating unit (B') or (B) and the copolymerized polycarbonate resin with the repeating unit (A) and the repeating unit (B') or (B).

<Repeating Unit (A)>

In the general formula (1) representing the repeating unit (A) of the polycarbonate resin according to the first invention, $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

To improve heat resistance, preferably, $R^1$ and $R^2$ in the general formula (1) independently denote a methyl group, or the alkyl groups in $R^1$ and $R^2$ are bonded together to form a ring represented by the following formula (1a) or (1b). In terms of the balance between heat resistance and fluidity, $R^1$ and $R^2$ particularly preferably independently denote a methyl group.

[Chem. 26]

(1a)

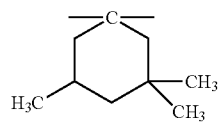
(1b)

To improve flame retardancy and dielectric properties, $R^3$ and $R^4$ in the general formula (1) preferably independently denote a methyl group.

Thus, the repeating unit (A) is particularly preferably a repeating structural unit derived from 2,2-bis(4-hydroxy-3-methylphenyl)propane (hereinafter sometimes abbreviated to "BPC") represented by the following formula (4).

[Chem. 27]

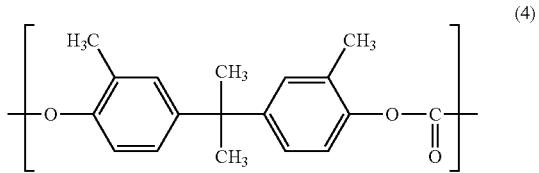

(4)

The polycarbonate resin according to the first invention may have only one repeating unit (A) or two or more repeating units (A).

<Repeating Unit (B') or (B)>

In the general formula (2') representing the repeating unit (B') of a polycarbonate resin according to the present invention, X' denotes a single bond or a methylene group.

In the general formula (2) representing the repeating unit (B) of the polycarbonate resin according to the first invention, X denotes a single bond or a divalent organic group represented by the following general formula (3).

To improve dielectric properties and flame retardancy, X in the general formula (2) preferably denotes a single bond or a methylene group. Thus, $R^5$ in the following general formula (3) preferably denotes a hydrogen atom.

[Chem. 28]

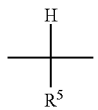

(3)

In the general formulae (2') and (2), $R^6$ to $R^9$ independently denote a substituted or unsubstituted alkyl group having 1 to 20 carbon atoms or a substituted or unsubstituted aryl group.

To improve heat resistance and flame retardancy, $R^6$ to $R^9$ in the general formula (2') preferably independently denote a methyl group.

The substitution positions of $R^6$ to $R^9$ in the general formula (2') are preferably, but not limited to, the substitution positions represented by the following general formula (2A') or the following general formula (2B'), particularly preferably the substitution positions of the following general formula (2A') in terms of improved impact resistance.

[Chem. 29]

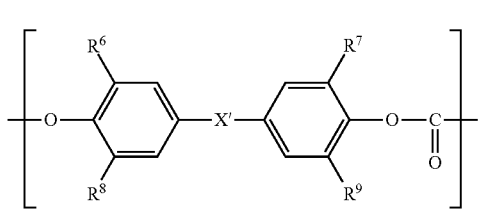

(2A')

In the general formula (2A'), X' and $R^6$ to $R^9$ have the same meaning as in the general formula (2').

[Chem. 30]

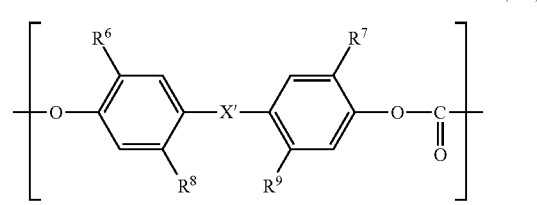

(2B')

In the general formula (2B'), X' and $R^6$ to $R^9$ have the same meaning as in the general formula (2').

The substitution positions of $R^6$ to $R^9$ in the general formula (2) are, but not limited to, preferably the substitution positions represented by the following general formula (2A) or the following general formula (2B), particularly preferably the substitution positions of the following general formula (2A) in terms of improved impact resistance.

[Chem. 31]

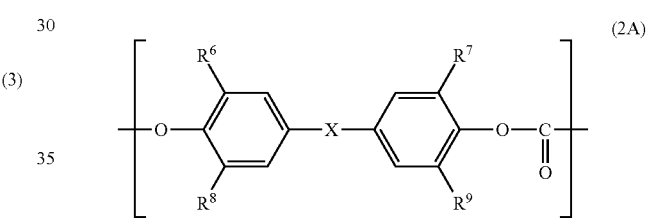

(2A)

In the general formula (2A), X and $R^6$ to $R^9$ have the same meaning as in the general formula (2).

[Chem. 32]

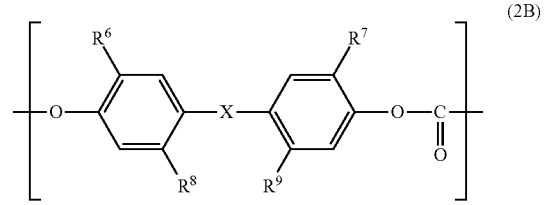

(2B)

In the general formula (2B), X and $R^6$ to $R^9$ have the same meaning as in the general formula (2).

In particular, the repeating unit (B') or (B) may be a repeating unit derived from 4,4-methylenebis(2,6-dimethylphenol) (hereinafter sometimes abbreviated to "TmBPF") represented by the following general formula (5) or a repeating unit derived from 2,2,6,6-tetramethyl-4,4-biphenol (hereinafter sometimes abbreviated to "TmBP", also referred to as 3,3',5,5'-tetramethyl-1,1'-biphenyl-4,4'-diol) represented by the following general formula (6).

[Chem. 33]

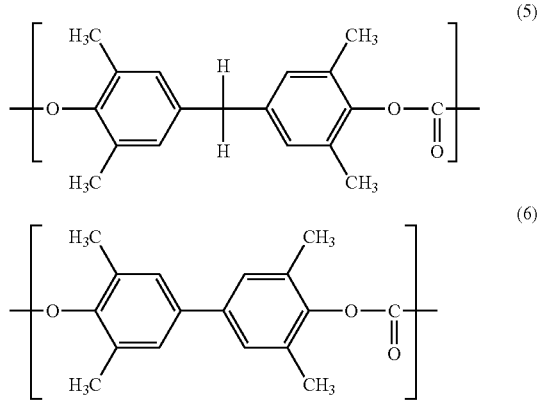

The polycarbonate resin according to the first invention may have only one repeating unit (B') or (B) or two or more repeating units (B') or (B).

<Repeating Unit (A)/Repeating Unit (B)>

The ratio of the repeating unit (A) to the repeating unit (B') or (B) in the polycarbonate resin according to the first invention is not particularly limited. The repeating unit (A)/repeating unit (B') or (B) (mole ratio) preferably ranges from 1:99 to 99:1, particularly preferably 1:99 to 90:10, more particularly preferably 10:90 to 80:20 still more particularly preferably 15:85 to 70:30.

<Another Repeating Unit (C)>

The polycarbonate resin according to the first invention may contain one or two or more other repeating units (C) other that the repeating unit (A) and the repeating unit (B') or (B) within the scope of not impairing the object of the first invention. Examples of the other repeating units (C) include repeating units derived from aromatic dihydroxy compounds, such as 2,2-bis(4-hydroxyphenyl)propane (bisphenol A), 2,2-bis(4-hydroxyphenyl)cyclohexane, 2,2-bis(4-hydroxyphenyl)-3,3,5-trimethylcyclohexane, and 6,6'-dihydroxy-3,3,3',3'-tetramethyl-1,1'-spirobiindane. Among these, repeating units derived from 2,2-bis(4-hydroxyphenyl)propane (bisphenol A) and 6,6'-dihydroxy-3,3,3',3'-tetramethyl-1,1'-spirobiindane are preferred.

To ensure the advantages of the first invention due to the repeating unit (A) and the repeating unit (B') or (B), the sum of the repeating unit (A) and the repeating unit (B') or (B) is preferably 40% or more by mole, more preferably 50% or more by mole, still more preferably 60% or more by mole, particularly preferably 70% or more by mole, of 100% by mole of all the carbonate structural units in the polycarbonate resin according to the first invention.

<Molecular Weight of Polycarbonate Resin>

The molecular weight of the polycarbonate resin according to the first invention is preferably, but not limited to, a viscosity-average molecular weight (Mv) of 14,500 or more calculated from the solution viscosity. A viscosity-average molecular weight equal to or higher than the lower limit is preferred because the thermoplastic resin composition, formed product, and housing for a communication device according to the first invention have improved heat resistance and flame retardancy. From such a perspective, the polycarbonate resin according to the first invention more preferably has a viscosity-average molecular weight of 16,000 or more, still more preferably 17,000 or more, particularly preferably 18,000 or more, most preferably 18,500 or more.

On the other hand, the polycarbonate resin according to the first invention preferably has a viscosity-average molecular weight (Mv) of 30,000 or less. A viscosity-average molecular weight equal to or lower than the upper limit is preferred because the thermoplastic resin composition according to the first invention containing the polycarbonate resin according to the first invention tends to have high fluidity. From such a perspective, the polycarbonate resin according to the first invention more preferably has a viscosity-average molecular weight of 29,000 or less, still more preferably 28,000 or less, particularly preferably 27,000 or less, most preferably 26,500 or less.

The viscosity-average molecular weight (Mv) of a polycarbonate resin refers to a value determined by measuring intrinsic viscosity (limiting viscosity) [η] (unit: dL/g) at a temperature of 20° C. with an Ubbelohde viscometer using methylene chloride as a solvent and calculated using Schnell viscosity equation $\eta = 1.23 \times 10^{-4} \, Mv^{0.83}$.

The intrinsic viscosity (limiting viscosity) [η] refers to a value determined by measuring specific viscosities [ηsp] at different solution concentrations [C] (g/dL) and calculated using the following formula.

$$\eta = \lim_{c \to 0} \eta_{sp}/c \qquad [\text{Math. 1}]$$

The same applies to the viscosity-average molecular weight (Mv) in the second invention and the third invention described later.

<Glass Transition Temperature (Tg)>

The class transition temperature (Tg) the polycarbonate resin according to the first invention is preferably, but not limited to, in the range of 125° C. to 200° C. Tg of 125° C. or more results in the thermoplastic resin composition, formed product, and housing for a communication device according to the first invention with Improved heat resistance. On the other hand, a polycarbonate resin with Tg of 200° C. or less results in high fluidity and forming processability of the thermoplastic resin composition according to the first invention containing the polycarbonate resin according to the first invention. Thus, the polycarbonate resin according to the first invention preferably has a glass transition temperature (Tg) is the range of 125° C. to 200° C.

The Tg of a polycarbonate resin is determined by a method described later in the examples.

<Pencil Hardness>

The thermoplastic resin composition according to the first invention containing the polycarbonate resin according to the first invention preferably has high hardness characteristics and preferably has a pencil hardness of F or higher, more preferably H or higher, particularly preferably 2H or higher, as measured by a method according to ISO 15184.

The pencil hardness of a thermoplastic resin composition is measured in a formed product of the thermoplastic resin composition by a method described later in the examples.

<Flame Retardancy: 20-mm Vertical Flame Test (0.8 mmt)>

When the result of a 20-mm vertical flame test (0.8 mmt) described later in the examples is V-2 in the material classification described in UL94, the flame retardancy of the polycarbonate resin according to the first invention preferably takes a longer time to ignite marking cotton with a smoking substance or dropping, for example, 10 seconds or more. Furthermore, the material classification is more preferably V-1 or V-0, particularly preferably V-0.

<Relative Dielectric Constant ($\varepsilon_r$), Dielectric Loss Tangent (tan δ)>

The polycarbonate resin according to the first invention preferably has a relative dielectric constant ($\varepsilon_r$) of 2.60 or less, more preferably 2.55 or less, particularly preferably 2.50 or less, measured at a temperature of 23° C. and at a frequency of 10 GHz. Furthermore, the dielectric loss tangent (tan δ×10$^{-3}$) is preferably 4.00 or less, more preferably 3.00 or less, particularly preferably 2.50 or less. A relative dielectric constant and a dielectric loss tangent equal to or lower than the upper limit result in high radio wave transmission in a microwave and/or millimeter-wave band.

The relative dielectric constant ($\varepsilon_r$) and dielectric loss tangent (tan δ×10$^{-3}$) of a polycarbonate resin are measured with a cavity resonator at a frequency of 10 GHz after a strip of film with a length of 70 mm and a width of 2 mm is cut out from a film of the polycarbonate resin with a thickness in the range of 30 to 250 μm and after humidity control at a room temperature of 23° C. and at a humidity of 50% for 48 hours. The details are described later in the examples.

<Method for Producing Polycarbonate Resin>

The polycarbonate resin according to the first invention can be produced by a known polymerization method, which is not particularly limited. Examples of the polymerization method include an interfacial polymerization method, a melt transesterification method, a pyridine method, a ring-opening polymerization method of a cyclic carbonate compound, and a solid phase transesterification method of a prepolymer. Among these, particularly suitable methods are more specifically described below.

(Interfacial Polymerization Method)

In the interfacial polymerization method, a raw material dihydroxy compound and a carbonate-forming compound are allowed to react in the presence of an inert organic solvent and an alkaline aqueous solution typically at a pH of 9 or more, and subsequent interfacial polymerization in the presence of a polymerization catalyst yields a polycarbonate resin. If necessary, the reaction system may include a molecular weight modifier (terminating agent) and an antioxidant for preventing the oxidation of the raw material dihydroxy compound.

Examples of the inert organic solvent include, but are not limited to, chlorinated hydrocarbons, such as dichloromethane, 1,2-dichloroethane, chloroform, monochlorobenzene, and dichlorobenzene; and aromatic hydrocarbons, such as benzene, toluene, and xylene.

The organic solvents may be used alone or combined in any ratio.

The alkaline aqueous solution may contain any alkaline compound, for example, an alkali or alkaline-earth metal compound, such as sodium hydroxide, potassium hydroxide, lithium hydroxide, or sodium hydrogen carbonate. Among these, sodium hydroxide and potassium hydroxide are preferred.

The alkaline compounds may be used alone or combined in any ratio.

The concentration of an alkaline compound in the alkaline aqueous solution is typically, but not limited to, in the range of 5% to 10% by mass to control the pH of the alkaline aqueous solution in the range of 10 to 12. In the case of blowing with phosgene, to control the pH of an aqueous phase in the range of 10 to 12, preferably 10 to 11, it is preferable that the mole ratio of the raw material dihydroxy compound to the alkaline compound is typically 1:1.9 or more, particularly 1:2.0 or more, and typically 1:3.2 or less, particularly 1:2.5 or less.

The raw material dihydroxy compound is at least a dihydroxy compound that can form the repeating unit (A) and the repeating unit (B') or (B) by a reaction with the carbonate-forming compound.

The carbonate-forming compound is suitably a carbonyl halide. Phosgene is particularly preferred. The method using phosgene is particularly referred to as a phosgene method.

Examples of the polymerization catalyst include, but are not limited to, aliphatic tertiary amines, such as trimethylamine, triethylamine, tributylamine, tripropylamine, and trihexylamine; alicyclic tertiary amines, such as N,N'-dimethylcyclohexylamine and N,N'-diethylcyclohexylamine; aromatic tertiary amines, such as N,N'-dimethylaniline and N,N'-diethylaniline; quaternary ammonium salts, such as trimethylbenzylammonium chloride, tetramethylammonium chloride, and triethylbenzylammonium chloride; pyridines; guanines; and guanidine salts.

The polymerization catalysts may be used alone or combined in any ratio.

Examples of the molecular weight modifier include, but are not limited to, aromatic phenols with a monohydric phenolic hydroxy group; aliphatic alcohols, such as methanol and butanol; mercaptans; and phthalimides. Among these, aromatic phenols are preferred.

Specific examples of the aromatic phenol include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-n-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkylphenols with a linear or branched alkyl group having 12 to 35 carbon atoms on average in the ortho, meta, or para position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol.

Among these, p-t-butylphenol, p-phenylphenol, and p-cumylphenol are preferably used.

The molecular weight modifiers may be used alone or combined in any ratio.

The amount of molecular weight modifier to be used is typically, but not limited to, 0.5 mol or more, preferably 1 mol or more, and typically 50 mol or less, preferably 30 mol or less, per 100 mol of the raw material dihydroxy compound.

The antioxidant may be, but is not limited to, a hindered phenolic antioxidant.

Specific examples include pentaerythritoltetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl)propionate], N,N'-hexane-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphate, 3,3',3'',5,5',5''-hexa-tert-butyl-a,a',a''-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1, 3,5-triazine-2,4,6(1H,3H,5H)-trione, 2,6-di-tert-butyl-4-(4,6-bis(octylthio)-1,3,5-triazine-2-ylamino)phenol, and 2-[1-(2-hydroxy-3,5-di-tert-pentylphenyl)ethyl]-4,6-di-tert-pentylphenyl acrylate.

Among these, pentaerythritoltetrakis[3-(3,5-di-tert-butyl-4-hydroxyphenyl)propionate] and octadecyl-3-(3,5-di-tert-butyl-4-hydroxyphenyl)propionate are preferred. Commercial products of such phenolic antioxidants include "Irganox 1010" and "Irganox 1076" manufactured by BASF and "ADK STAB AO-50" and "ADK STAB AO-60" manufactured by Adeka Corp.

The antioxidants may be used alone or combined in any ratio.

The amount antioxidant to be used is preferably, but not limited to, 0.001 parts or more by mass, more preferably 0.01 parts or more by mass, still more preferably 0.1 parts or more by mass, per 100 parts by mass of the raw material dihydroxy compound. An amount of antioxidant equal to or higher than the lower limit results in a sufficient effect of the antioxidant. The amount of antioxidant to be used is preferably 1 part or less by mass, more preferably 0.5 parts or less by mass, per 100 parts by mass of the raw material hydroxy compound. An amount antioxidant equal to or lower than the upper limit can result in less gas evolution during injection molding.

In the reaction, a reaction substrate (reaction raw material), a reaction solvent (organic solvent), a catalyst, and an additive agent are mixed in any order, provided that a desired polycarbonate resin can be produced. Thus, the order may be appropriately determined. For example, when phosgene is used as a carbonate-forming compound, the molecular weight modifier may be added at any point between the reaction (phosgenation) of the raw material dihydroxy compound with phosgene and the beginning of the polymerization reaction.

The reaction temperature is preferably, but not limited to, in the range of 0° C. to 40° C. The reaction time is preferably, but not limited to, in the range of several minutes (for example, 10 minutes) to several hours (for example, 6 hours).

(Melt Transesterification Method)

The melt transesterification method involves transesterification between a carbonate ester and the raw material dihydroxy compound, for example.

The raw material dihydroxy compound is the same as that in the interfacial polymerization method.

Examples of the carbonate ester include compounds represented by the following general formula (I), such as aryl carbonates, dialkyl carbonates, biscarbonates of dihydroxy compounds, monocarbonates of dihydroxy compounds, and carbonates of dihydroxy compounds, such as cyclic carbonates.

[Chem. 34]

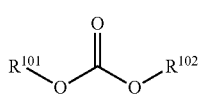

(I)

In the general formula (I), $R^{101}$ and $R^{102}$ independently denote an alkyl group having 1 to 30 carbon atoms, an aryl group, or an arylalkyl group. When $R^{101}$ and $R^{102}$ independently denote an alkyl group or an arylalkyl group, the compound is hereinafter sometimes referred to as a dialkyl carbonate, and when $R^{101}$ and $R^{102}$ independently denote an aryl group, the compound is hereinafter sometimes referred to as a diaryl carbonate. In terms of reactivity with the dihydroxy compound, both $R^{101}$ and $R^{102}$ preferably independently denote an aryl group, more preferably a diaryl carbonate represented by the following general formula (II).

[Chem. 35]

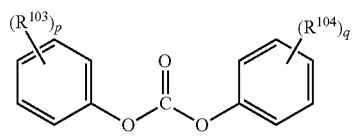

(II)

In the general formula (II), $R^{103}$ and $R^{104}$ independently denote a halogen atom, a nitro group, a cyano group, an alkyl group having 1 to 20 carbon atoms, an alkoxycarbonyl group having 1 to 20 carbon atoms, a cycloalkyl group having 4 to 20 carbon atoms, or an aryl group having 6 to 20 carbon atoms. p and q independently denote an integer in the range of 0 to 5.

Specific examples of the carbonate ester include dialkyl carbonates, such as dimethyl carbonate, diethyl carbonate, and di-t-butyl carbonate, and (optionally substituted) diaryl carbonate, such as diphenyl carbonate (hereinafter sometimes abbreviated to "DPC"), bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, bis(methylsalicylphenyl)carbonate, and ditolyl carbonate. Among these, diphenyl carbonate is preferred.

These carbonate esters may be used alone or in combination.

Preferably 50% or less by mole, more preferably 30% or less by mole, of the carbonate ester may be substituted with dicarboxylic acid or dicarboxylate. Typical examples of the dicarboxylic acid or dicarboxylate include terephthalic acid, isophthalic acid, diphenyl terephthalate, and diphenyl isophthalate. Substitution with such a dicarboxylic acid or dicarboxylate yields a polyester carbonate.

The ratio of the raw material dihydroxy compound to the carbonate ester may be any ratio that can result in a desired polycarbonate resin. The carbonate ester is preferably used in excess with respect to the raw material dihydroxy compound in polymerization with the dihydroxy compound.

The amount of the carbonate ester is preferably 1.01 times or more (mole ratio), more preferably 1.02 times or more, the amount of the dihydroxy compound. A mole ratio equal to or higher than the lower limit results in a polycarbonate resin with high thermal stability.

The amount of the carbonate ester preferably 1.30 times or less (mole ratio), more preferably 1.20 times or less, the amount of the dihydroxy compound. A mole ratio equal to or lower than the upper limit is suitable in terms of improved reactivity, improved productivity of a polycarbonate resin with a desired molecular weight, and a lower residual carbonate ester content of the resin, which can result in less malodor during shape processing or of a formed product.

A transesterification catalyst is typically used to produce a polycarbonate resin by the melt transesterification method. The transesterification catalyst may be, but is not limited to, a known transesterification catalyst. For example, an alkali metal compound and/or an alkaline-earth metal compound is preferably used. In an auxiliary manner, for example, a basic compound, such as a basic boron compound, a basic phosphorus compound, a basic ammonium compound, or an amine compound, may be combined.

The transesterification catalysts may be used alone or combined in any ratio.

In the melt transesterification method, the reaction temperature is typically, but not limited to, in the range of 100° C. to 320° C.

The reaction pressure is typically, but not limited to, a reduced pressure of 2 mmHg or less.

In specific procedures, a melt polycondensation reaction may be performed under the conditions described above while removing by-products.

A polycarbonate resin according to the present invention is significantly affected by thermal history and oxidation in the presence of an alkaline catalyst and consequently has poor hue. It is therefore preferred to set the reaction temperature at 320° C. or less and select a reduced-pressure condition with a lower limit of approximately 0.05 mmHg to prevent oxygen from leaking into an apparatus due to an excessively reduced pressure.

The reaction may performed batch-wise or continuously. In a batch-wise reaction, a reaction substrate, a reaction solvent, a catalyst, and an additive agent are mixed in any order provided that a desired polycarbonate resin can be produced. Thus, the order may be appropriately determined.

If necessary, the melt transesterification method may use a catalyst deactivator. The catalyst deactivator may be any compound that can neutralize the transesterification catalyst. Examples of the catalyst deactivator include sulfur-containing acidic compounds and derivatives thereof and phosphorus-containing acidic compounds and derivatives thereof.

The catalyst deactivators may be used alone or combined in any ratio.

The amount of catalyst deactivator to be used is typically, but not limited to, 0.5 equivalent or more, preferably 1 equivalent or more, more preferably 3 equivalent or more, and typically 50 equivalent or less, preferably 10 equivalent or less, more preferably 8 equivalent or less, of the transesterification catalyst. The amount of catalyst deactivator to be used is typically 1 ppm or more and 100 ppm or less, preferably 50 ppm or less, of the polycarbonate resin.

[Other Components]

The thermoplastic resin composition according to the first invention may contain another component as required in addition to the polycarbonate resin according to the first invention without significantly impairing the desired physical properties. Examples of the other component include resins other than the polycarbonate resin according to the first invention and various resin additive agents.

The other components may be used alone or combined in any ratio.

Examples of resins other than the polycarbonate resin according to the first invention are as follows:

thermoplastic polyester resins, such as poly(ethylene terephthalate) resins (PET resins), poly(trimethylene terephthalate) (PTT resins), and poly(butylene terephthalate) resins (PET resins);

styrene resins, such as polystyrene resins (PS resins), high-impact polystyrene resins (HIPS), acrylonitrile-styrene copolymers (AS resins), acrylonitrile-butadiene-styrene copolymers (ABS resins), acrylonitrile-styrene-acrylic rubber copolymers (ASA resins), and acrylonitrile-ethylene propylene rubber-styrene copolymers (AES resins);

polyolefin resins, such as polyethylene resins (PE resins), polypropylene resins (PP resins), and cyclic cycloolefin resins (COP resins); and polyamide resins (PA resins); polyimide resins (PI resins); poly(ether imide) resins (PEI resins); polyurethane resins (PU resins); poly(phenylene ether) resins (PPE resins); poly(phenylene sulfide) resins (PPS resins); polysulfone resins (PSU resins); polymethacrylate resins (PMMA resins); liquid crystal polymers (LCP), and the like.

The thermoplastic resin composition according to the first invention may contain one type of resin other than the polycarbonate resin according to the first invention or may contain two or more types of resin other than the polycarbonate resin according to the first invention in any ratio.

When the thermoplastic resin composition according to the first invention contains a resin other than the polycarbonate resin according to the first invention, to more effectively ensure the advantages of the first invention by the polycarbonate resin according to the first invention, the amount of the polycarbonate resin according to the first invention in the total resin components contained in the thermoplastic resin composition according to the first invention is preferably 20% or more by mass, more preferably 30% or more by mass, still more preferably 40% or more by mass, particularly preferably 50% or more by mass, most preferably 60% or more by mass.

Examples of the resin additive agents include heat stabilizers, antioxidants, release agents, ultraviolet absorbers, dyes and pigments, flame retardants, anti-dripping agents, antistatic agents, anti-fogging agents, lubricants, anti-blocking agents, flow modifiers, plasticizers, dispersants, antimicrobial agents, glass fiber, carbon fiber, inorganic filler, and organic fiber.

The thermoplastic resin composition according to the first invention may contain one of these resin additive agents or two or more of these resin additive agents combined in any ratio.

The amount of the polycarbonate resin according to the first invention in the thermoplastic resin composition according to the first invention including these resins other than the polycarbonate resin according to the first invention and the resin additive agents is preferably 30% or more by mass, more preferably 40% or more by mass, still more preferably 50% or more by mass, particularly preferably 60% by mass, most preferably 70% to 100% by mass.

[Method for Producing Thermoplastic Resin Composition]

The thermoplastic resin composition according to the first invention may be produced by any method, including a wide variety of known methods for producing a thermoplastic resin composition. More specifically, the polycarbonate resin according to the first invention and optional another resin and resin additive agents are melt-kneaded in a mixer, such as a Banbury mixer, a roller, a single-screw extruder, a twin-screw extruder, or a kneader.

[Formed Product]

To produce the formed product according to the first invention using the thermoplastic resin composition according to the first invention, pellets produced by pelletizing the thermoplastic resin composition produced as described above may be formed into the formed product by various forming methods, or the thermoplastic resin composition according to the first invention melt-kneaded in an extruder without pelletization may be directly formed into the formed product.

The shape of the formed product according to the first invention is not particularly limited, can be appropriately selected according to the application and purpose of the formed product, and may be flat, plate-like, rod-like, sheet-like, film-like, cylindrical, annular, circular, elliptical, polygonal, deformed, hollow, frame-like, box-like, or panel-like. The formed product may also have an uneven surface or may have a three-dimensional shape with a three-dimensional curved surface. When used as a sheet, film, plate, or the like, the formed product may be layered with another resin sheet to form a laminate with a multilayer structure.

A method for forming the formed product may be, but is not limited to, a known forming method. Examples include an injection molding method, an injection compression molding method, an extrusion method, a profile extrusion method, a transfer forming method, a hollow molding method, a gas-assisted blow molding method, a blow molding method, extrusion blow molding, an in-mold coating (IMC) forming method, a rotational molding method, a multilayer forming method, a coinjection molding method, an insert molding method, a sandwich forming method, a foam molding method, a compression molding method, a sheet forming method, a thermoforming method, a laminate molding method, and a press forming method. Among these, an injection molding method or an extrusion method is suitably used.

The forming temperature for forming the thermoplastic resin composition according to the first invention is preferably 200° C. or more, more preferably 250° C. or more, most preferably 280° C. or more. A forming temperature equal to or higher than the lower limit results in improved fluidity and formability. The forming temperature for forming the thermoplastic resin composition according to the first invention is preferably 350° C. or less, particularly preferably 320° C. or less. A forming temperature equal to or lower than the upper limit can result in a thermoplastic resin composition with good color tone.

For injection molding or extrusion, a pigment, a dye, a release agent, a heat stabilizer, and the like may be appropriately added to the thermoplastic resin composition according to the first invention within the scope of not impairing the object of the present invention.

<Injection-Molded Product>

The thermoplastic resin composition according to the first invention can be suitably used as an injection-molded product by injection molding. The injection molding method is not particularly limited, and any common molding method for thermoplastic resin can be used. Examples of the common molding method include an ultra-high-speed injection molding method, an injection compression molding method, a coinjection molding method, gas-assisted and other blow molding methods, molding methods using insulated molds, molding methods using rapid heating molds, a foam molding (including supercritical fluid) method, an insert molding method, and an IMC (in-mold coating molding) molding method. A hot-runner molding method may also be used.

When an injection molding machine or the like is used, the mold temperature is preferably 150° C. or less, more preferably 120° C. or less, most preferably 100° C. or less. A mold temperature equal to or lower than the upper limit results in a shorter cooling time in molding, a shorter production cycle of the formed product, and improved productivity. When an injection molding machine or the like is used, the mold temperature is preferably 30° C. or more, particularly preferably 50° C. or more. A mold temperature equal to or higher than the lower limit is preferred in terms of the uniformity of the formed product.

<Extrudate>

The thermoplastic resin composition according to the first invention can be suitably used as an extrudate by extrusion. The production of an extrudate from the thermoplastic resin composition according to the first invention has no particular limitation but typically uses an extruder. The extruder is typically equipped with a T-die, a cylindrical die, or the like, and can produce extrudates of various shapes. Examples of extrudates include sheets, films, plates, tubes, and pipes. Among these, sheets or films are preferred.

A hard coat layer may be formed on one or both sides of an extrudate of the thermoplastic resin composition according to the first invention to improve adhesiveness, coatability, or printability. Alternatively, a film for improving weatherability and/or scratch resistance may be thermally laminated on one or both sides of the extrudate. Furthermore, the surface may be subjected to embossing, translucent or opaque processing, or another processing.

[Housing for Communication Device]

The formed product according to the first invention produced using the thermoplastic resin composition according to the first invention has high microwave and/or millimeter-wave band transmission as well as high heat resistance and flame retardancy and is therefore useful as a housing for a communication device with a built-in microwave and/or millimeter-wave antenna for which these characteristics are strictly required.

Such a housing for a communication device with a built-in microwave and/or millimeter-wave antenna may have any shape, pattern, color, size, and the like, which are appropriately selected according to the intended use of the housing.

In the first invention, the term "microwave" refers to a radio wave with a frequency in the range of 3.0 to 30 GHz, and the term "millimeter-wave" refers to a radio wave with a frequency in the range of 30 to 300 GHz. Thus, the microwave and/or millimeter-wave refers to a radio wave with a frequency in the range of 3.0 to 300 GHz. Thus, a communication device with a built-in microwave and/or millimeter-wave antenna refers to a communication device with a built-in antenna for transmitting and receiving a radio wave with a frequency in the range of 3.0 to 300 GHz. Specific examples of the communication device include notebook computers, tablet devices, smartphones, and routers that transmit and receive a radio wave with a frequency in the range of 3.0 to 300 GHz.

The frequency of transmission and reception by the microwave and/or millimeter-wave antenna of the housing for a communication device with a built-in microwave and/or millimeter-wave antenna according to the first invention may range from 3.0 to 300 GHz, preferably 3.2 to 250 GHz, more preferably 3.4 to 200 GHz.

In particular, the housing for a communication device with a built-in microwave and/or millimeter-wave antenna according to the first invention can be suitably used for a radio wave in a frequency band in the range of 3.5 to 30 GHz used in a fifth-generation mobile communication system (5G).

Radio waves in a microwave and/or millimeter-wave band tend to have poor radio wave transmission. From such a perspective, a housing for a communication device with a built-in antenna for transmitting and receiving a radio wave in a microwave and/or millimeter-wave band is required to have high radio wave transmission.

Communication devices for transmitting and receiving radio waves in a microwave and/or millimeter-wave band tend to generate heat. Thus, a housing for a communication device with a built-in antenna for transmitting and receiving a radio wave in a microwave and/or millimeter-wave band is required to have high heat resistance and flame retardancy.

The polycarbonate resin according to the first invention contained in the thermoplastic resin composition according to the first invention for use in the housing for a communication device with a built-in antenna for transmitting and receiving a radio wave in a microwave and/or millimeter-wave band according to the first invention has a low relative dielectric constant, a low dielectric loss tangent, high heat resistance, and high flame retardancy. Thus, the thermoplastic resin composition according to the first invention containing the polycarbonate resin according to the first invention has a low relative dielectric constant, a low dielectric loss tangent, high heat resistance, and high flame retardancy and is suitable for use in a housing of a communication device for transmitting and receiving radio waves in a microwave and/or millimeter-wave band.

Specific examples of a housing for a communication device with a built-in microwave and/or millimeter-wave antenna include housings for notebook computers, tablet devices, smartphones, and routers. The formed product according to the first invention formed of the thermoplastic resin composition according to the first invention is particularly suitable for these applications.

Second Invention

[Polycarbonate Resin Composition]

A polycarbonate resin composition according to the second invention has a carbonate structural unit (X) derived from an aromatic dihydroxy compound represented by the following formula (11) (hereinafter sometimes referred to as an "aromatic dihydroxy compound (11)") (hereinafter referred to simply as the "carbonate structural unit (X)") and a carbonate structural unit (Y) derived from an aromatic dihydroxy compound represented by the following formula (12) (hereinafter sometimes referred to as an "aromatic dihydroxy compound (12)") (hereinafter referred to simply as the "carbonate structural unit (Y)") at a mole ratio (X)/(Y) in the range of 1/99 to 99/1. The carbonate structural unit (X) and the carbonate structural unit (Y) contained at a ratio (X)/(Y) in the range of 1/99 to 99/1 (mole ratio) result in a polycarbonate resin composition according to the present invention with very high surface hardness, alkali resistance, heat resistance, and impact strength as well as high transparency and good hue.

[Chem. 36]

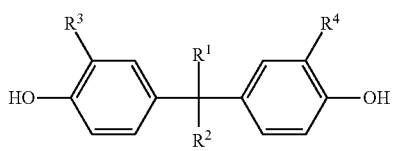

(11)

In the general formula (11), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 37]

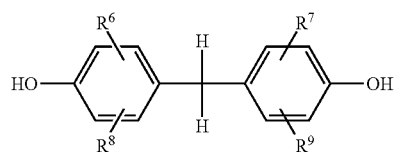

(12)

In the general formula (12), $R^6$ to $R^9$ independently denote a substituted or unsubstituted alkyl group having 1 to 20 carbon atoms or a substituted or unsubstituted aryl group.

The polycarbonate resin composition according to the second invention only needs to contain the carbonate structural unit (X) and the carbonate structural unit (Y) at the above mole ratio (X)/(Y), and the carbonate structural unit (X) and the carbonate structural unit (Y) may be contained in any form. The carbonate structural unit (X) and the carbonate structural unit (Y) are typically contained in a polycarbonate resin. Thus, the polycarbonate resin composition according to the second invention may be a polycarbonate resin mixture of a polycarbonate resin with the carbonate structural unit (X) and a polycarbonate resin with the carbonate structural unit (Y) or may contain a copolymerization type polycarbonate resin with both the carbonate structural unit (X) and the carbonate structural unit (Y).

The polycarbonate resin composition according to the second invention having the carbonate structural unit (X) and the carbonate structural unit (Y) as a copolymerized polycarbonate resin with the carbonate structural unit (X) and the carbonate structural unit (Y) is referred to as a "polycarbonate resin".

The polycarbonate resin composition according to the second invention being a mixture of the polycarbonate resin with the carbonate structural unit (X) and the polycarbonate resin with the carbonate structural unit (Y) is typically referred to as a "polycarbonate resin composition".

Thus, in the second invention, the term "polycarbonate resin composition" also includes those composed of one type of copolymerized polycarbonate resin with the carbonate structural unit (X) and the carbonate structural unit (Y).

<General Formulae (11) and (12)>

In the polycarbonate resin composition according to the second invention, in the general formula (11), $R^1$ and $R^2$ independently denote a hydrogen atom, a substituted or unsubstituted alkyl group having 1 to 20 carbon atoms, or a substituted or unsubstituted aryl group.

Specific examples of the substituted or unsubstituted alkyl group having 1 to 20 carbon atoms in $R^1$ and $R^2$ are as follows:

a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group;

a methylethyl group, a methylpropyl group, a methylbutyl group, a methylpentyl group, a methylhexyl group, a methylheptyl group, a methyloctyl group, a methylnonyl group, a methyldecyl group, a methylundecyl group, a methyldodecyl group, a methyltridecyl group, a methyltetradecyl group, a methylpentadecyl group, a methylhexadecyl group, a methylheptadecyl group, a methyloctadecyl group, and a methylnonadecyl group;

a dimethylethyl group, a dimethylpropyl group, a dimethylbutyl group, a dimethylpentyl group, a dimethylhexyl group, a dimethylheptyl group, a dimethyloctyl group, a dimethylnonyl group, a dimethyldecyl group, a dimethylundecyl group, a dimethyldodecyl group, a dimethyltridecyl group, a dimethyltetradecyl group, a dimethylpentadecyl group, a dimethylhexadecyl group, a dimethylheptadecyl group, and a dimethyloctadecyl group;

a trimethylbutyl group, a trimethylpentyl group, a trimethylhexyl group, a trimethylheptyl group, a trimethyloctyl group, a trimethylnonyl group, a trimethyldecyl group, a trimethylundecyl group, a trimethyldodecyl group, a trimethyltridecyl group, a trimethyltetradecyl group, a trimethylpentadecyl group, a trimethylhexadecyl group, and a trimethylheptadecyl group;

an ethylpentyl group, an ethylhexyl group, an ethylheptyl group, an ethyloctyl group, an ethylnonyl group, an ethyldecyl group, an ethylundecyl group, an ethyldodecyl group, an ethyltridecyl group, an ethyltetradecyl group, an ethylpentadecyl group, an ethylhexadecyl group, an ethylheptadecyl group, and an ethyloctadecyl group;

a propylhexyl group, a propylheptyl group, a propyloctyl group, a propylnonyl group, a propyldecyl group, a propylundecyl group, a propyldodecyl group, a propyltridecyl group, a propyltetradecyl group, a propylpentadecyl group, a propylhexadecyl group, and a propylheptadecyl group; and a butylhexyl group, a butylhepyl group, a butyloctyl group, a butylnonyl group, a butyldecyl group, a butylundecyl group, a butyldodecyl group, a butyltridecyl group, a butyltetradecyl group, a butylpentadecyl group, and a butylhexadecyl group.

$R^1$ and $R^2$ in the general formula (11), which independently denote a substituted or unsubstituted alkyl group having 1 to 20 carbon atoms, may be bonded together to form a ring, and specific examples thereof include those represented by the following general formulae (15) and (16).

[Chem. 38]

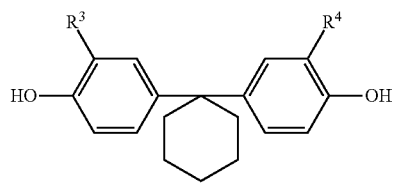

(15)

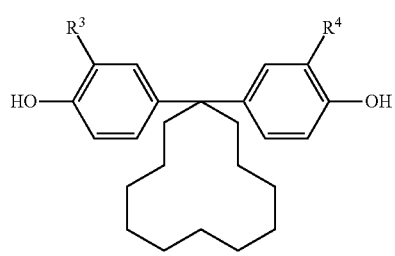

(16)

In the general formulae (15) and (16), $R^3$ and $R^4$ have the same meaning as in the general formula (11).

Specific examples of the substituted or unsubstituted aryl group in $R^1$ and $R^2$ include a phenyl group, a tolyl group, a 4-methylphenyl group, and a naphthyl group.

Among these, $R^1$ and $R^2$ preferably independently denote a hydrogen atom, a methyl group, or an ethyl group, more preferably a methyl group, and particularly preferably both $R^1$ and $R^2$ independently denote a methyl group.

In the polycarbonate resin composition according to the second invention, in the general formula (11e), $R^3$ and $R^4$ independently denote a substituted or unsubstituted alkyl group having 1 to 20 carbon atoms or a substituted or unsubstituted aryl group. The substituted or unsubstituted alkyl group having 1 to 20 carbon atoms or the substituted or unsubstituted aryl group can improve the surface hardness, alkali resistance, and the like of the polycarbonate resin composition according to the second invention.

Specific examples of $R^3$ and $R^4$ include a methyl group, an ethyl group, a propyl group, an isopropyl group, a n-butyl group, an isobutyl group, a sec-butyl group, a tert-butyl group, a pentyl group, a n-hexyl group, a cyclohexyl group, a n-heptyl group, a n-octyl group, a n-nonyl group, a n-decyl, a n-undecyl group, a n-dodecyl group, a n-tridecyl group, a n-tetradecyl group, a n-pentadecyl group, a phenyl group, and a tolyl group. Among these, a methyl group is preferred.

The aromatic dihydroxy compound (11) according to the second invention is preferably an aromatic dihydroxy compound represented by the following general formula (13) in terms of improved surface hardness.

[Chem. 39]

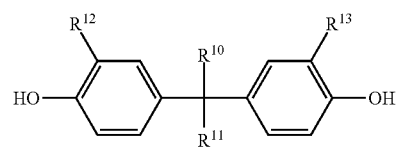

(13)

In the general formula (13), $R^{10}$ and $R^{11}$ independently denote a hydrogen atom or a methyl group. $R^{12}$ and $R^{13}$ independently denote a methyl group or an ethyl group.

Preferred specific examples of the aromatic dihydroxy compound (11) according to the second invention include 2,2-bis(4-hydroxy-3-methylphenyl)propane represented by the following formula (11a) (hereinafter sometimes abbreviated to "BPC"), 2,2-bis(2-hydroxy-5-biphenylyl)propane represented by the following formula (11b), 1,1-bis(4-hydroxy-3-methylphenyl)cyclododecane represented by the following formula (11c), 4,4-ethylidenebis(2-methylphenol) represented by the following formula (11d), 4,4-(octahydro-4,7-methano-5H-indene-5-ylidene)bis(2-methylphenol) represented by the following formula (11e), and 1,1-bis(4-hydroxy-3-methylphenyl)cyclohexane represented by the following formula (11f).

[Chem. 40]

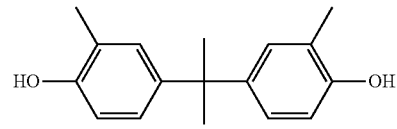

(11a)

-continued

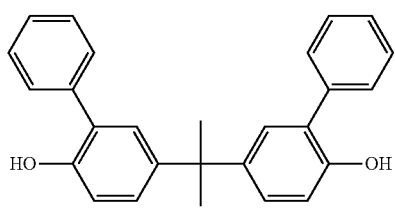
(11b)

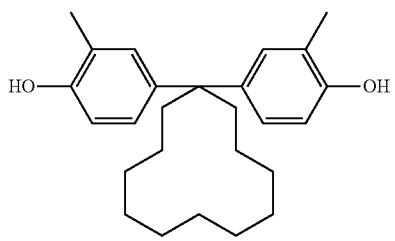
(11c)

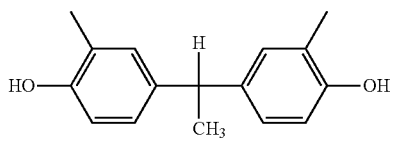
(11d)

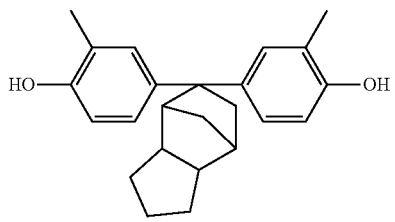
(11e)

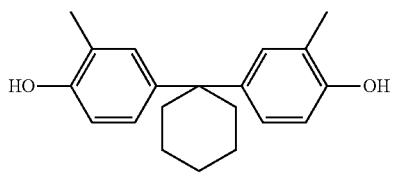
(11f)

Among these, BPC represented by the formula (11a) is most preferred.

In the carbonate structural unit (Y) in the second invention, benzene rings of the bisphenol linked together by a methylene group as in the general formula (12) can improve the impact resistance and the like of the polycarbonate resin composition according to the second invention.

In the polycarbonate resin composition according to the second invention, in the general formula (12), $R^6$ to $R^9$ independently denote a substituted or unsubstituted alkyl group having 1 to 20 carbon atoms or a substituted or unsubstituted aryl group. The substituted or unsubstituted alkyl group having 1 to 20 carbon atoms or the substituted or unsubstituted aryl group in $R^6$ to $R^9$ can improve the surface hardness, a alkali resistance, and the like of the polycarbonate resin composition according to the second invention. $R^6$ to $R^9$ preferably independently denote a methyl group or an ethyl group, more preferably a methyl group.

The aromatic dihydroxy compound (12) according to the second invention is preferably an aromatic dihydroxy compound represented by the following general formula (14), particularly preferably an aromatic dihydroxy compound represented by the following general formula (14A), in terms of improved surface hardness, impact resistance, and alkali resistance.

[Chem. 41]

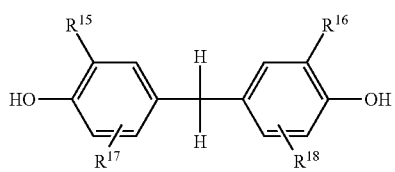
(14)

In the general formula (14), $R^{15}$ to $R^{18}$ independently denote a methyl group or an ethyl group.

[Chem. 42]

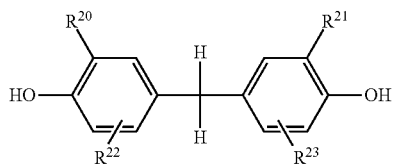
(14A)

In the general formula (14A), $R^{20}$ to $R^{23}$ independently denote a methyl group or an ethyl group.

In the general formula (14A), the substitution positions of $R^{22}$ and $R^{23}$ are more preferably positions shown in the following general formula (14B).

[Chem. 43]

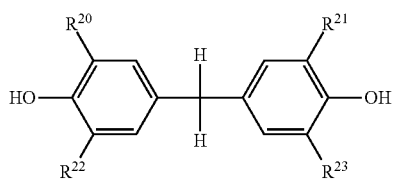
(14B)

In the general formula (14B), $R^{20}$ to $R^{23}$ have the same meaning as in the general formula (14A).

Preferred specific examples of the aromatic dihydroxy compound (12) according to the second invention include 4,4-methylenebis(2,6-dimethylphenol) represented by the following formula (12a) (hereinafter sometimes abbreviated to "TmBPF") and 4,4-methylenebis(2,5-dimethylphenol) represented by the following formula (12b) (hereinafter sometimes abbreviated to "Bis25X-F").

[Chem. 44]

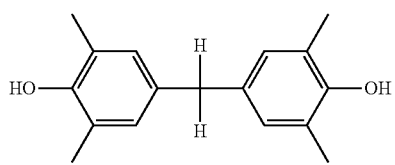
(12a)

-continued

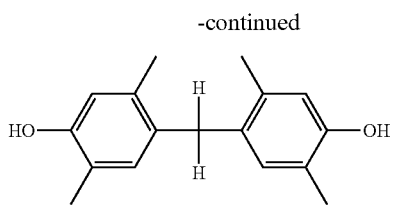

(12b)

<Carbonate Structural Unit (X), (Y)>

The polycarbonate resin composition according to the second invention is characterized by having the carbonate structural unit (X) and the carbonate structural unit (Y) at a mole ratio (X)/(Y) in the range of 1/99 to 99/1. Heat resistance is further improved with the ratio of the carbonate structural unit (Y). The ratio (X)/(Y) therefore preferably ranges from 1/99 to 85/15, more preferably 15/75 to 65/35.

The polycarbonate resin composition according to the second invention may contain only one type of carbonate structural unit (X) or may contain two or more types of carbonate structural unit (X). In other words, a carbonate structural unit (X) derived from two or more aromatic dihydroxy compounds (11) may be contained. Likewise, only one type or two or more types of carbonate structural unit (Y) may be contained. In other words, a carbonate structural unit (Y) derived from two or more aromatic dihydroxy compounds (12) may be contained.

The polycarbonate resin composition according to the second invention only needs to contain the carbonate structural unit (X) and the carbonate structural unit (Y) at the above mole ratio (X)/(Y), and the carbonate structural unit (X) content and the carbonate structural unit (Y) content are not particularly limited within the scope of not impairing the features of the polycarbonate resin composition according to the second invention. To ensure the advantages of the second invention due to the carbonate structural unit (X) and the carbonate structural unit (Y) in the polycarbonate resin composition according to the second invention, the total of the carbonate structural unit (X) content and the carbonate structural unit (Y) content is preferably 10% or more by mole, preferably 15% or more by mole, more preferably 20% or more by mole, particularly preferably 25% to 100% by mole, of all the carbonate structural units in the polycarbonate resin composition.

<Another Carbonate Structural Unit>

The polycarbonate resin composition according to the second invention may contain a carbonate structural unit other than the carbonate structural units (X) and (Y), that is, a carbonate structural unit derived from a dihydroxy compound other than the aromatic dihydroxy compounds (11) and (12), within the scope of not impairing the object of the second invention.

Examples of the dihydroxy compound other than the aromatic dihydroxy compounds (11) and (12) are as follows: dihydroxybiphenyls, such as 2,5-dihydroxybiphenyl, 2,2'-dihydroxybiphenyl, 4,4'-dihydroxybiphenyl; dihydroxydiaryl ethers, such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene; bis(hydroxyaryl)alkanes, such as 2,2-bis(4-hydroxyphenyl)propane (hereinafter sometimes abbreviated to "BPA"), 1,1-bis(4-hydroxyphenyl)propane, 2,2-bis(3-methoxy-4-hydroxyphenyl) propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl) cyclohexylmethane, bis(4-hydroxyphenyl) phenylmethane, bis(4-hydroxyphenyl)(4-propenylphenyl)methane, bis(4-hydroxyphenyl) diphenylmethane, bis(4-hydroxyphenyl) naphthylmethane, 1,1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, 2-bis(4-hydroxyphenyl)butane, 2,2-bis(4-hydroxyphenyl) pentane, 1,1-bis(4-hydroxyphenyl)hexane, 2,2-bis(4-hydroxyphenyl)hexane, 1-bis(4-hydroxyphenyl) octane, 2-bis(4-hydroxyphenyl)octane, 1-bis(4-hydroxyphenyl)hexane, 2-bis(4-hydroxyphenyl) hexane, 4,4-bis(4-hydroxyphenyl)heptane, 2,2-bis(4-hydroxyphenyl)nonane, 10-bis(4-hydroxyphenyl) decane, and 1-bis(4-hydroxyphenyl)dodecane; bis(hydroxyaryl)cycloalkanes, such as 1-bis(4-hydroxyphenyl)cyclopentane, 1-bis(4-hydroxyphenyl) cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis 4-hydroxyphenyl)-3-tert-butyl-cyclohexane, 1,1-bis(4-hydroxyphenyl)-3-phenylcyclohexane, and 1,1-bis(4-hydroxyphenyl)-4-phenylcyclohexane; bisphenols with a cardo structure, such as 9,9-bis(4-hydroxyphenyl)fluorene and 9,9-bis (4-hydroxy-3-methylphenyl)fluorene; dihydroxydiaryl sulfides, such as 4,4'-dihydroxydiphenyl sulfide and 4,4'-dihydroxy-3,3'-dimethyldiphenyl sulfide; dihydroxydiaryl sulfoxides, such as 4,4'-dihydroxydiphenyl sulfoxide and 4,4'-dihydroxy-3,3'-dimethyldiphenyl sulfoxide; and dihydroxydiaryl sulfones, such as 4,4'-dihydroxydiphenyl sulfone and 4,4'-dihydroxy-3,3'-dimethyldiphenyl sulfone.

Among these, the dihydroxy compound other than the aromatic dihydroxy compounds (11) and (12) is preferably a bis(hydroxyaryl)alkane, particularly preferably a bis(4-hydroxyphenyl)alkane, more particularly preferably 2,2-bis(4-hydroxyphenyl)propane (BPA) in terms of impact resistance and beat resistance.

The dihydroxy compounds other than the aromatic dihydroxy compounds (11) and (12) may be used alone or combined in any ratio.

<Molecular Weight of Polycarbonate Resin Composition>

The molecular weight of the polycarbonate resin composition according to the second invention is preferably a viscosity-average molecular weight (Mv) in the range of 15,000 to 33,000 calculated from the solution viscosity. A viscosity-average molecular weight equal to or higher than the lower limit results in the polycarbonate resin composition according to the second invention with good mechanical properties and high alkali resistance. A viscosity-average molecular weight equal to or lower than the upper limit tends to result in the polycarbonate resin composition according to the second invention with sufficient fluidity. From such a perspective, the polycarbonate resin composition according to the second invention preferably has a viscosity-average molecular weight (Mv) of 16,500 or more, more preferably 18,000 or more, and preferably 31,500 or less, more preferably 30,000 or less.

<Pencil Hardness>

The polycarbonate resin composition according to the second invention preferably has high hardness characteristics and preferably has a pencil hardness of H or higher, more preferably 2H or higher, as measured by the method according to ISO 15184.

The pencil hardness of a polycarbonate resin composition is measured in a formed product of the polycarbonate resin composition by a method described later in the examples.

<Glass Transition Temperature>

The polycarbonate resin composition according to the second invention preferably has a glass transition temperature Tg in the range of 130° C. to 200° C. A Tg of 130° C. or more can result in high heat resistance. A Tg of 200° C. or less can result in high fluidity and forming processability. Thus, the polycarbonate resin composition according to the second invention particularly preferably as a glass transition temperature Tg in the range of 130° C. to 200° C.

The Tg of a polycarbonate resin composition is determined by a method described later in the examples.

<Other Components>

If necessary, the polycarbonate resin composition according to the second invention may contain another component in addition to the polycarbonate resin with the carbonate structural unit (X) and/or the carbonate structural unit (Y) without significantly impairing the desired physical properties. Examples of the other component include polycarbonate resins without the carbonate structural unit (X) or the carbonate structural unit (Y), resins other than polycarbonate resins, and various resin additive agents.

Examples of the resin additive agents include heat stabilizers, antioxidants, release agents, light stabilizers (HALS), flame retardants, antistatic agents, anti-fogging agents, lubricants, anti-blocking agents, flow modifiers, plasticizers, dispersants, antimicrobial agents, dyes, and pigments.

The resin additive agents may be used alone or combined in any ratio.

Examples of other resins include thermoplastic polyester resins, such as poly(ethylene terephthalate) resins, poly (trimethylene terephthalate), and poly(butylene terephthalate) resins; styrene resins, such as polystyrene resins, high-impact polystyrene resins (HIPS), acrylonitrile-styrene copolymers (AS resins), acrylonitrile-styrene-acrylic rubber copolymers (ASA resins), and acrylonitrile-ethylene propylene rubber-styrene copolymers (AES resins); polyolefin resins, such as polyethylene resins and polypropylene resins; polyamide resins; polyimide resins; poly(ether imide) resins; polyurethane resins; poly(phenylene ether) resins; poly (phenylene sulfide) resins; polysulfone resins; and polymethacrylate resins.

The other resins may be used alone or combined in any ratio.

[Method for Producing Polycarbonate Resin Composition]

The polycarbonate resin constituting the polycarbonate resin composition according to the second invention can be produced in the same manner as the polycarbonate resin according to the first invention except that at least the aromatic dihydroxy compound (11) and the aromatic dihydroxy compound (12) are used as raw material dihydroxy compounds.

A copolymerized polycarbonate resin with the carbonate structural unit (X) and the carbonate structural unit (Y) can be produced by using the aromatic dihydroxy compound (11) and the aromatic dihydroxy compound (12) as raw material dihydroxy compounds. One of these aromatic dihydroxy compounds can be used to produce a polycarbonate resin with the carbonate structural unit (X) or the carbonate structural unit (Y).

[Method for Producing Formed Product]

A typical extruder or injection molding machine is used to produce a resin formed product from the polycarbonate resin composition according to the second invention.

The forming temperature for forming the polycarbonate resin composition according to the second invention is preferably 200° C. or more, more preferably 250° C. or more, most preferably 280° C. or more, and preferably 350° C. or less, particularly preferably 320° C. or less. An excessively low forming temperature may result in high melt viscosity, low fluidity, and low formability. An excessively high forming temperature may unfavorably result in a colored polycarbonate resin composition and a formed product with poor color tone.

For injection molding or extrusion, a pigment, a dye, a release agent, a heat stabilizer, and the like may be appropriately added to the polycarbonate resin composition according to the second invention within the scope of not impairing the object of the second invention.

<Injection-Molded Product>

A typical injection molding machine is used to produce an injection-molded product from the polycarbonate resin composition according to the second invention.

When an injection molding machine or the like is used, the mold temperature is preferably 150° C. or less, more preferably 120° C. or less, most preferably 100° C. or less, and preferably 30° C. or more, particularly preferably 50° C. or more. An excessively high mold temperature requires a long cooling time in forming and may result in a long production cycle of the formed product and low productivity. An excessively low mold temperature may unfavorably result in a polycarbonate resin composition with excessively high melt viscosity, a nonuniform formed product, and a formed product with uneven surface.

<Extrudate>

A typical extruder is used to produce an extrudate from the polycarbonate resin composition according to the second invention. The extruder is typically equipped with a T-die, a cylindrical die, or the like, and can produce extrudates of various shapes. Examples of extrudates include sheets, films, plates, tubes, and pipes. Among these, sheets or films are preferred.

A hard coat layer may be formed on one or both sides of an extrudate of the polycarbonate resin composition according to the second invention to improve adhesiveness, coatability, or printability. Alternatively, a film for improving weatherability and/or scratch resistance may be thermally laminated on one or both sides of the extrudate. Furthermore, the surface may be subjected to embossing, translucent or opaque processing, or another processing.

A formed product of the polycarbonate resin composition according to the second invention can be used in buildings, vehicles, electrical and electronic devices, machinery, and other various fields.

Third Invention

[Polycarbonate Resin Composition]

A polycarbonate resin composition according to the third invention has the carbonate structural unit (X) derived from an aromatic dihydroxy compound represented by the following general formula (11) (hereinafter sometimes referred to as the "aromatic dihydroxy compound (11)") (hereinafter referred to simply as the "carbonate structural unit (X)") and a carbonate structural unit (Z) derived from an aromatic dihydroxy compound represented by the following general formula (21) (hereinafter sometimes referred to as an "aromatic dihydroxy compound (21)") (hereinafter referred to simply as the "carbonate structural unit (Z)") at a mole ratio of the carbonate structural unit (X)/carbonate structural unit (Z) (hereinafter sometimes referred to as "(X)/(Z)") in the range of 1/99 to 99/1. The carbonate structural unit (X) and the carbonate structural unit (Z) contained at a ratio (X)/(Z) in the range of 1/99 to 99/1 (mole ratio) result in the polycarbonate resin composition according to the third invention with very high surface hardness, alkali resistance, heat resistance, impact strength, and fluidity as well as high transparency and good hue.

[Chem. 45]

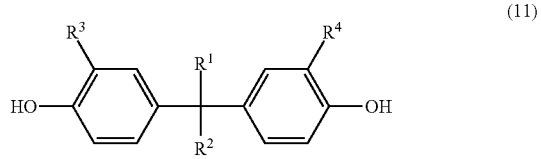

(11)

In the general formula (11), $R^1$ and $R^2$ independently denote a hydrogen atom, a substituted or unsubstituted alkyl group having 1 to 20 carbon atoms, or a substituted or unsubstituted aryl group. The alkyl groups in $R^1$ and $R^2$ may be bonded together to form a ring. $R^3$ and $R^4$ independently denote a substituted or unsubstituted alkyl group having 1 to 20 carbon atoms or a substituted or unsubstituted aryl group.

[Chem. 46]

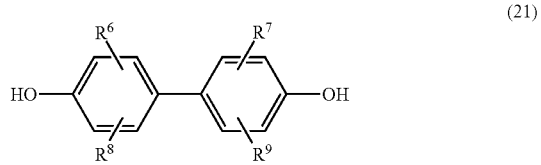

(21)

In the general formula (21), $R^6$ to $R^9$ independently denote a substituted or unsubstituted alkyl group having: 1 to 20 carbon atoms or a substituted or unsubstituted aryl group.

The polycarbonate resin composition according to the third invention only needs to contain the carbonate structural unit (X) and the carbonate structural unit (Z) at a mole ratio (X)/(Z) in the range of 1/99 to 99/1, and the carbonate structural unit (X) and the carbonate structural unit (Z) may be contained in any form. The carbonate structural unit (X) and the carbonate structural unit (Z) are typically contained in a polycarbonate resin.

The polycarbonate resin composition according to the third invention may be a polycarbonate resin mixture of a polycarbonate resin with the carbonate structural unit (X) and a polycarbonate resin with the carbonate structural unit (Z) or may contain a copolymerization type polycarbonate resin with both the carbonate structural unit (X) and the carbonate structural unit (Z). The polycarbonate resin composition according to the third invention may be a mixture of a polycarbonate resin with the carbonate structural unit (X) and/or the carbonate structural unit (Z) and a copolymerized polycarbonate resin with the carbonate structural unit (X) and the carbonate structural unit (Z) or may further contain a polycarbonate resin without the carbonate structural unit (X) or the carbonate structural unit (Z).

The polycarbonate resin composition according to the third invention having the carbonate structural unit (X) and the carbonate structural unit (Z) as a copolymerized polycarbonate resin with the carbonate structural unit (X) and the carbonate structural unit (Z) is referred to as a "polycarbonate resin".

The polycarbonate resin composition according to the third invention being a mixture of the polycarbonate resin with the carbonate structural unit (X) and the polycarbonate resin with the carbonate structural unit (Z) is typically referred to as a "polycarbonate resin composition". The same applies to another composition form.

Thus, in the third invention, the term "polycarbonate resin composition" includes those composed of one type of copolymerized polycarbonate resin with the carbonate structural unit (X) and the carbonate structural unit (Z).

<General Formulae (11) and (21)>

The general formula (11), the aromatic dihydroxy compound (11), and the carbonate structural unit (X) in the polycarbonate resin composition according to the third invention are the same as the general formula (11), the aromatic dihydroxy compound (11), and the carbonate structural unit (X) in the polycarbonate resin composition according to the second invention, and those preferred are also the same.

In the polycarbonate resin composition according to the third invention, two benzene rings linked together by a single bond as in the general formula (21) can improve the impact resistance.

In the polycarbonate resin composition according to the third invention, in the general formula (21), $R^6$ to $R^9$ independently denote a substituted or unsubstituted alkyl group having 1 to 20 carbon atoms or a substituted or unsubstituted aryl group. The substituted or unsubstituted alkyl group having 1 to 20 carbon atoms or the substituted or unsubstituted aryl group in $R^6$ to $R^9$ can improve the surface hardness, alkali resistance, and the like of the polycarbonate resin composition according to the third invention. Specific examples of the substituted or unsubstituted alkyl group having 1 to 20 carbon atoms or the substituted or unsubstituted aryl group in $R^6$ to $R^9$ include those exemplified as specific examples of the substituted or unsubstituted alkyl group having 1 to 20 carbon atoms or the substituted or unsubstituted aryl group in $R^3$ or $R^4$ of the general formula (11), preferably a methyl group or an ethyl group, more preferably a methyl group.

The aromatic dihydroxy compound (21) according to the third invention is preferably an aromatic dihydroxy compound represented by the following general formula (22), particularly preferably an aromatic dihydroxy compound represented by the following general formula (22A), in terms of improved surface hardness, impact resistance, and alkali resistance.

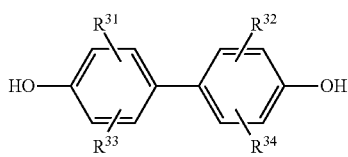

(22)

In the general formula (22), $R^{31}$ to $R^{34}$ independently denote a methyl group or an ethyl group.

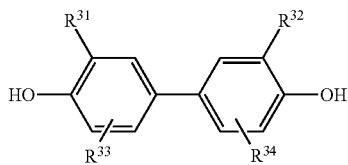

(22A)

In the general formula (22A), $R^{31}$ to $R^{34}$ have the same meaning as in the general formula (22).

In the general formula (22A), the substitution positions of $R^{33}$ and $R^{34}$ are more preferably positions shown in the following general formula (22B).

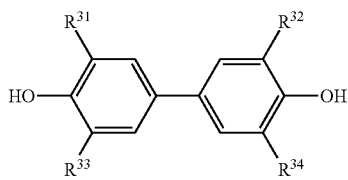

(22B)

In the general formula (22B), $R^{31}$ to $R^{34}$ have the same meaning as in the general formula (22A).

Preferred specific examples of the aromatic dihydroxy compound (21) according to the third invention is 2,2,6,6-tetramethyl-4,4-biphenol (hereinafter sometimes abbreviated to "TmBP", also referred to as 3,3',5,5'-tetramethyl-1,1'-biphenyl-4,4'-diol) represented by the following formula (23).

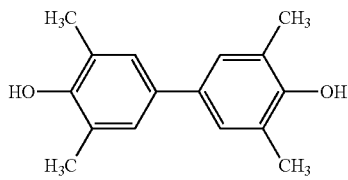

(23)

<Carbonate Structural Units (X) and (Z)>

The polycarbonate resin composition according to the third invention is characterized by having the carbonate structural unit (X) and the carbonate structural unit (Z) at a mole ratio (X)/(Z) in the range of 1/99 to 99/1. Heat resistance is further improved with the ratio of the carbonate structural unit (Z). The ratio (X)/(Z) therefore preferably ranges from 1/99 to 95/5, more preferably 5/95 to 90/10.

The mole ratio of the carbonate structural unit (X) to the carbonate structural unit (Z) in the polycarbonate resin composition according to the third invention can be calculated by measuring $^1$H-NMR of the polycarbonate resin composition dissolved in deuterochloroform. More specifically, the deuterochloroform solution of the polycarbonate resin is prepared at a polycarbonate resin concentration of 50 mg/mL, and the measurement is performed 128 times at 30° C. and at a relaxation time of 6 seconds.

The ratio of the carbonate structural unit (X), the carbonate structural unit (Z), and another carbonate structural unit described later in the polycarbonate resin composition according to the third invention can also be calculated from the component ratio of the dihydroxy compounds charged in the production of the polycarbonate resin. The ratio is calculated from the ratio of charged components in the examples described later.

The polycarbonate resin composition according to the third invention may contain only one type of carbonate structural unit (X) or may contain two or more types of carbonate structural unit (X). In other words, a carbonate structural unit (X) derived from two or more aromatic dihydroxy compounds (11) may be contained. Likewise, only one type or two or more types of carbonate structural unit (Z) may be contained. In other words, a carbonate structural unit (Z) derived from two or more aromatic dihydroxy compounds (21) may be contained.

The polycarbonate resin composition according to the third invention only needs to contain the carbonate structural unit (X) and the carbonate structural unit (Z) at the above mole ratio (X)/(Z), and the carbonate structural unit (X) content and the carbonate structural unit (Z) content are not particularly limited within the scope of not impairing the features of the polycarbonate resin composition according to the third invention. To ensure the advantages of the third invention due to the carbonate structural unit (X) and the carbonate structural unit (Z) in the polycarbonate resin composition according to the third invention, the total of the carbonate structural unit (X) content and the carbonate structural unit (Z) content is preferably 20% or more by mole, preferably 40% or more by mole, more preferably 60% or more by mole, particularly preferably 60% to 100% by mole, of all the carbonate structural units in the polycarbonate resin composition.

<Another Carbonate Structural Unit>

The polycarbonate resin composition according to the third invention may contain a carbonate structural unit other than the carbonate structural units (X) and (Z), that is, a carbonate structural unit derived from a dihydroxy compound other than the aromatic dihydroxy compounds (11) and (21), within the scope of not impairing the object of the third invention.

Examples of the dihydroxy compound other than the aromatic dihydroxy compounds (11) and (21) are as follows:
dihydroxybiphenyls, such as 2,5-dihydroxybiphenyl, 2,2'-dihydroxybiphenyl, and 4,4'-dihydroxybiphenyl;
dihydroxydiaryl ethers, such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;
bis(hydroxyaryl)alkanes, such as 2,2-bis(4-hydroxyphenyl)propane (hereinafter sometimes abbreviated to "BPA"), 1,1-bis(4-hydroxyphenyl)propane, 2,2-bis(3- methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane (hereinafter sometimes abbreviated to "TmBPA"), 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,2-bis[2-(4-hydroxyphenyl)-2-propyl]benzene, bis(4-hydroxyphenyl)methane, bis(4-hydroxy-3,5-dimethylphenyl)methane(4,4-methylenebis(2,6-dimethylphenol) (hereinafter sometimes abbreviated to "TmBPF"), bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1,1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, 2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1-bis(4-hydroxyphenyl)octane, 2-bis(4-hydroxyphenyl)octane, 1-bis(4-hydroxyphenyl)hexane, 2-bis(4-hydroxyphenyl)hexane, 4,4-bis(4-hydroxyphenyl)heptane, 2,2-bis(4-hydroxyphenyl)nonane, 10-bis(4-hydroxyphenyl)decane, and 1-bis(4-hydroxyphenyl)dodecane;

bis(hydroxyaryl)cycloalkanes, such as 1-bis(4-hydroxyphenyl)cyclopentane, 1-bis(4-hydroxyphenyl)cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis(4-hydroxyphenyl)-3-tert-butyl-cyclohexane, 1,1-bis(4-hydroxyphenyl)-3-phenylcyclohexane, and 1,1-bis(4-hydroxyphenyl)-4-phenylcyclohexane;

bisphenols with a cardo structure, such as 9,9-bis(4-hydroxyphenyl)fluorene and 9,9-bis(4-hydroxy-3-methylphanyl)fluorene;

dihydroxydiaryl sulfides, such as 4,4'-dihydroxydiphenyl sulfide and 4,4'-dihydroxy-3,3'-dimethyldiphenyl sulfide;

dihydroxydiaryl sulfoxides, such as 4,4'-dihydroxydiphenyl sulfoxide and 4,4'-dihydroxy-3,3'-dimethyldiphanyl sulfoxide; and dihydroxydiaryl sulfones, such as 4,4'-dihydroxydiphenyl sulfone and 4,4'-dihydroxy-3,3'-dimethyldiphenyl sulfone.

Among these, the dihydroxy compound other than the aromatic dihydroxy compounds (11) and (21) is preferably a bis(hydroxyaryl)alkane, particularly preferably a bis(4-hydroxyphenyl)alkane, more particularly preferably 2,2-bis(4-hydroxyphenyl)propane (BPA) or bis(4-hydroxy-3,5-dimethylphenyl)methane (4,4-methylenebis(2,6-dimethylphenol) (TmBPF)) in terms of impact resistance and heat resistance, or TmBPF in terms of improved dielectric properties.

The dihydroxy compounds other than the aromatic dihydroxy compounds (11) and (21) may be used alone or combined in any ratio.

<Molecular Weight of Polycarbonate Resin>

The molecular weight of the polycarbonate resin in the polycarbonate resin composition according to the third invention is preferably, but not limited to, a viscosity-average molecular weight (Mv) of 16,000 or more calculated from the solution viscosity. A viscosity-average molecular weight equal to or higher than the lower limit is preferred because the polycarbonate resin composition according to the third invention has improved mechanical properties and alkali resistance. From such a perspective, the viscosity-average molecular weight of the polycarbonate resin is more preferably 17,000 or more, still more preferably 18,000 or more, particularly preferably 18,500 or more. The viscosity-average molecular weight (Mv) of the polycarbonate resin in the polycarbonate resin composition according to the third invention is preferably 30,000 or less. A viscosity-average molecular weight equal to or lower than the upper limit is preferred because the polycarbonate resin composition according to the third invention tends to have high fluidity. From such a perspective, the viscosity-average molecular weight of the polycarbonate resin is more preferably 29,000 or less, still more preferably 28,000 or less, particularly preferably 27,000 or less.

<Pencil Hardness>

The polycarbonate resin composition according to the third invention may have any pencil hardness, preferably has high hardness characteristics, and preferably has a pencil hardness of H or higher, more preferably 2H or higher, as measured by the method according to ISO 15184.

The pencil hardness of a polycarbonate resin composition is measured in a formed product of the polycarbonate resin composition by a method described later in the examples.

<Glass Transition Temperature>

The polycarbonate resin composition according to the third invention preferably has a glass transition temperature Tg in the range of 130° C. to 200° C. A Tg of 130° C. or more can result in high heat resistance. A Tg of 200° C. or less can result in high fluidity and forming processability. Thus, the polycarbonate resin composition according to the third invention preferably has a glass transition temperature Tg in the range of 130° C. to 200° C.

The Tg of a polycarbonate resin composition is determined by a method described later in the examples.

<Other Components>

If necessary, the polycarbonate resin composition according to the third invention may contain another component in addition to the polycarbonate resin with the carbonate structural unit (X) and/or the carbonate structural unit (Z) without significantly impairing the desired physical properties. Examples of the other component include polycarbonate resins without the carbonate structural unit (X) or the carbonate structural unit (Z), resins other than polycarbonate resins, and various resin additive agents.

To ensure the advantages of the third invention due to a polycarbonate resin with the carbonate structural unit (X) and the carbonate structural unit (Z), the polycarbonate resin composition according to the third invention preferably contains a total of 65% or more by mass, particularly preferably 70% or more by mass, more particularly preferably 75% or more by mass, of the carbonate structural unit (X) and the carbonate structural unit (Z) in 100% by mass of the polycarbonate resin composition.

The polycarbonate resin content of the polycarbonate resin composition according to the third invention is preferably 80% or more by mass, more preferably 85% or more by mass, particularly preferably 90% or more by mass, per 100% by mass of the polycarbonate resin composition according to the third invention to effective provide the features of the third invention.

Examples of the resin additive agents include heat stabilizers, antioxidants, release agents, light stabilizers (HALS), flame retardants, antistatic agents, anti-fogging agents, lubricants, anti-blocking agents, flow modifiers, plasticizers, dispersants, antimicrobial agents, dyes, and pigments.

The resin additive agents may be used alone or combined in any ratio.

Examples of other resins include thermoplastic polyester resins, such as poly(ethylene terephthalate) resins, poly(trimethylene terephthalate), and poly(butylene terephthalate) resins; styrene resins, such as polystyrene resins, high-impact polystyrene resins (HIPS), acrylonitrile-styrene copolymers (AS resins), acrylonitrile-styrene-acrylic rubber copolymers (ASA resins), and acrylonitrile-ethylene propylene rubber-styrene copolymers (AES resins); polyolefin resins, such as polyethylene resins and polypropylene resins; polyimide resins; polyimide resins; poly(ether imide) resins; polyurethane resins; poly(phenylene ether) resins; poly(phenylene sulfide) resins; polysulfone resins; and polymethacrylate resins.

The other resins may be used alone or combined in any ratio.

[Method for Producing Polycarbonate Resin]

The polycarbonate resin constituting the polycarbonate resin composition according to the third invention can be produced in the same manner as the polycarbonate resin according to the first invention except that at least the aromatic dihydroxy compound (11) and the aromatic dihydroxy compound (21) are used as raw material dihydroxy compounds.

A copolymerized polycarbonate resin with the carbonate structural unit (X) and the carbonate structural unit (Z) can be produced by using the aromatic dihydroxy compound (11) and the aromatic dihydroxy compound (21) as raw material dihydroxy compounds. One of these aromatic dihydroxy compounds can be used to produce a polycarbonate resin with the carbonate structural unit (X) or the carbonate structural unit (Z).

[Method for Producing Polycarbonate Resin Formed Product]

A typical extruder or injection molding machine is used to produce a polycarbonate resin formed product from the polycarbonate resin composition according to the third invention.

The forming temperature for forming the polycarbonate resin composition according to the third invention is preferably 200° C. or more, more preferably 250° C. or more, most preferably 280° C. or more. A forming temperature equal to or higher than the lower limit results in improved fluidity and formability. The forming temperature for forming the polycarbonate resin composition according to the third invention is preferably 350° C. or less, particularly preferably 320° C. or less. A forming temperature equal to or lower than the upper limit can result in a polycarbonate resin composition with good color tone.

For injection molding or extrusion, a pigment, a dye, a release agent, a heat stabilizer, and the like may be appropriately added to the polycarbonate resin composition according to the third invention within the scope of not impairing the object of the present invention.

[Formed Product]

The polycarbonate resin composition according to the third invention can be suitably used as a formed product by thermal processing, such as injection molding or extrusion. Such a polycarbonate resin formed product may have any shape, pattern, color, size, and the like, which are appropriately selected according to the intended use of the formed product. For example, such a polycarbonate resin formed product may be flat, plate-like, rod-like, sheet-like, film-like, cylindrical, annular, circular, elliptical, polygonal, deformed, hollow, frame-like, box-like, panel-like, or of a special shape. The formed product may also have an uneven surface or may have a three-dimensional shape with a three-dimensional curved surface.

<Injection-Molded Product>

The polycarbonate resin composition according to the third invention can be suitably used as an injection-molded product by injection molding. The injection molding method is not particularly limited, and any common molding method for thermoplastic resin can be used. Examples of the common molding method include an ultra-high-speed injection molding method, an injection compression molding method, a coinjection molding method, gas-assisted and other blow molding methods, molding methods using insulated molds, molding methods using rapid heating molds, a foam molding (including supercritical fluid) method, an insert molding method, and an IMC (in-mold coating molding) molding method. A hot-runner molding method may also be used.

When an injection molding machine or the like is used, the mold temperature is preferably 150° C. or less, more preferably 120° C. or less, most preferably 100° C. or less. A mold temperature equal to or lower than the upper limit results in a shorter cooling time in molding, a shorter production cycle of the formed product, and improved productivity. When an injection molding machine or the like is used, the mold temperature is preferably 30° C. or more, particularly preferably 50° C. or more. A mold temperature equal to or higher than the lower limit is preferred in terms of the uniformity of the formed product.

<Extrudate>

The polycarbonate resin composition according to the third invention can be suitably used as an extrudate by extrusion. The production of an extrudate from the polycarbonate resin composition according to the third invention has no particular limitation but typically uses an extruder. The extruder is typically equipped with a T-die, a cylindrical die, or the like, and can produce extrudates of various shapes. Examples of extrudates include sheets, films, plates, tubes, and pipes. Among these, sheets or films are preferred.

A hard coat layer may be formed on one or both sides of an extrudate of the polycarbonate resin composition according to the third invention to improve adhesiveness, coatability, or printability. Alternatively, a film for improving weatherability and/or scratch resistance may be thermally laminated on one or both sides of the extrudate. Furthermore, the surface may be subjected to embossing, translucent or opaque processing, or another processing.

<Applications>

A formed product of the polycarbonate resin composition according to the third invention can be used as various automotive parts, electrical and electronic devices, information terminal equipment, OA equipment, mechanical components, household electrical appliances, vehicle parts, architectural components, various containers, recreational equipment and sundries, lighting equipment, and other parts, for example. Among these, a formed product according to the present invention has high surface hardness and alkali resistance as well as high at resistance, impact resistance, and fluidity, is therefore particularly suitably used for electrical and electronic devices, information terminal equipment, OA equipment, household electrical appliances, and other parts, and is particularly suitably used as a forming material for housings of electrical and electronic devices, information terminal equipment, OA equipment, automotive interior parts, and household electrical appliances.

EXAMPLES

The present invention is more specifically described in the following examples.

The present invention is not limited to these examples.

The physical properties of polycarbonate resins produced in the following examples and comparative examples were evaluated by the following methods.
(1) Surface Hardness: Pencil Hardness A polycarbonate resin plate with a thickness of 3 mm, a length of 25 mm, and a width of 25 mm was formed with a small injection molding machine (Shinko Sellbic Co., Ltd. C, Mobile) at a cylinder temperature and a mold temperature shown in Tables 1 and 2, and a test specimen was prepared. The pencil hardness of the test specimen was measured in accordance with ISO 15184 with a pencil hardness tester (manufactured by Toyo Seiki Seisaku-Sho, Ltd.) at a load of 750 g.
(2) Fluidity: Viscosity-Average Molecular Weight (Mv)

The intrinsic viscosity (limiting viscosity) $[\eta]$ (unit: dL/g) of a polycarbonate resin dissolved in methylene chloride (concentration: 6.0 g/L) was measured with an Ubbelohde viscometer (manufactured by Moritomo Rika Kogyo) at 20° C., and the viscosity-average molecular weight (Mv) was calculated using the Schnell viscosity equation (the following equation).

$$\eta = 1.23 \times 10^{-4} \, Mv^{0.83}$$

(3) Heat Resistance: Glass Transition Temperature (Tg)

The amount of eat of approximately 10 mg of a polycarbonate resin sample was measured with a differential scanning calorimeter (DSC 6220 manufactured by SII) while heating the sample at a heating rate of 20° C./min, and an extrapolated glass transition starting temperature was determined in accordance with JIS K 7121. The extrapolated glass transition starting temperature is the temperature at a point of intersection between an extended line of the baseline from the low temperature side to the high temperature side and a tangent line drawn at a point of the maximum gradient of a curve of a stepwise change portion of glass transition. The extrapolated glass transition temperature was defined as the glass transition temperature (Tg).
(4) Impact Resistance: Izod Impact Strength A polycarbonate resin plate with a thickness of 3.2 mm, a length of 53.5 mm, and a width of 12.7 mm was formed with the small injection molding machine (Shinko Sellbic Co., Ltd. C, Mobile) at a cylinder temperature and a mold temperature shown in Tables 1 and 2, and test specimens were prepared. The test specimens were subjected to an impact test 5 times with a 60-kg hammer in accordance with JIS K-7110, and the number of broken specimens was compared.
(5) Alkali Resistance A polycarbonate resin plate with a thickness of 3 mm, a length of 25 mm, and a width of 25 mm was formed with a small injection molding machine (Shinko Sellbic Co., Ltd. C, Mobile) at a cylinder temperature and a mold temperature shown in Tables 1 and 2, and a test specimen was prepared. The test specimen was immersed in a 25% by mass aqueous NaOH in a laboratory dish at 50° C. for 92 hours and was then taken out. After washing with water, a test specimen with no change was rated "S", a slightly whitened test specimen was rated "A", a whitened test specimen was rated "B", and a significantly whitened test specimen was rated "C".
(6) Flame Retardancy: 20-mm Vertical Flame Test (0.8 mmt)

Polycarbonate resin pellets were dried at 120° C. for 4 hours and were formed into a combustion test specimen of 125 mm×13 mm×0.8 mm in thickness with an injection molding machine ("SE100" manufactured by Sumitomo Heavy Industries, Ltd.) at a cylinder temperature of 300° C. and at a mold temperature of 80° C.

The combustion test specimen was subjected to a 20-mm vertical flame test according to UL94 (Oct. 29, 1996, 5th edition). The combustion test results were classified as V-0, V-1, V-2, and nonconforming according to the material classification described in UL94.

For the classification of V-2, the longest time to ignite marking cotton with a smoking substance or dropping was recorded and compared.
(7) Dielectric Properties: Relative Dielectric Constant ($\varepsilon_r$) and Dielectric Loss Tangent (tan $\delta$)

A polycarbonate resin dried under vacuum at 80° C. for 5 hours was formed with a hot pressing machine into a film with a thickness in the range of 40 to 150 μm. The forming conditions for the hot pressing machine were appropriately adjusted in the temperature range of 150° C. to 250° C. and in the pressure range of 10 to 15 MPa. A strip of film with length of 70 mm and a width of 2 mm was cut out from the film and was subjected to humidity control at a room temperature of 23° C. and at a humidity of 50% for 48 hours. The relative dielectric constant ($\varepsilon_r$) and the dielectric loss tangent (tan $\delta \times 10^{-3}$) were measured at a frequency of 10 GHz with a cavity resonator (CP-531 manufactured by KANTO Electronic Application and Development Inc.) and a series network analyzer (E8361A PNA manufactured by Keysight Technologies).

Example 1

A raw material mixture was prepared by charging a 150-ml glass reactor equipped with a reactor stirrer, a reactor heater, and a reactor pressure regulator with 23.34 g (approximately 0.091 mol) of 4,4-methylenebis(2,6-dimethylphenol) (TmBPF) (manufactured by Tokyo Chemical Industry Co., Ltd.), 93.37 g (approximately 0.364 mol) of 2,2-bis(4-hydroxy-3-methylphenyl)propane (BPC) (manufactured by Honshu Chemical Industry Co., Ltd.), 99.97 g (approximately 0.467 mol) of diphenylcarbonate (DPC), and 0.4% by mass aqueous solution of cesium carbonate as a catalyst such that the amount of cesium carbonate was 3 μmol per mole of all the dihydroxy compounds.

The glass reactor was then evacuated to a pressure of approximately 50 Pa (0.38 Torr) and was then filled with nitrogen to atmospheric pressure. This operation was performed three times to purge the reactor with nitrogen. After the nitrogen purge, the external temperature of the reactor was increased to 220° C. to gradually increase the internal temperature of the reactor and dissolve the mixture. The stirrer was then rotated at 100 rpm. The absolute pressure in the reactor was then reduced from 101.3 kPa (760 Torr) to 13.3 kPa (100 Torr) over 40 minutes while distilling off a by-product phenol of an olgomerization reaction between the dihydroxy compounds and DPC in the reactor.

A transesterification reaction was then performed for 80 minutes while maintaining the pressure in the reactor at 13.3 kPa and further distilling off the phenol. The external temperature of the reactor was then increased to 250° C., and the absolute pressure in the reactor was reduced from 13.3 kPa (100 Torr) to 399 Pa (3 Torr) over 40 minutes to remove the distilled phenol from the system. Furthermore, the external temperature of the reactor was increased to 285° C., and the absolute pressure in the reactor was reduced to 30 Pa (approximately 0.2 Torr) to perform a polycondensation reaction. The polycondensation reaction was completed when the reactor stirrer had a predetermined stirring power.

The reactor was then filled with nitrogen to an absolute pressure of 101.3 kPa and was pressured to a gauge pressure of 0.2 MPa. A strand of the polycarbonate resin was drawn out from the bottom of the reactor and was pelletized with a rotary cutter.

The polycarbonate resin thus produced was subjected to the evaluation as described above. Table 1 shows the results.

Example 2

The method described in Example 1 was performed except that a raw material mixture was prepared by adding 46.69 g (approximately 0.182 mol) of TmBPF (manufactured by Tokyo Chemical Industry Co., Ltd.), 70.02 g (approximately 0.273 mol) of BPC (manufactured by Honshu Chemical Industry Co., Ltd.), 99.97 g (approximately 0.467 mol) of DPC, and a 0.4% by mass aqueous solution of cesium carbonate as a catalyst such that the amount of cesium carbonate was 5 µmol per mole of all the dihydroxy compounds.

The polycarbonate resin thus produced was subjected to the evaluation as described above. Tables 1 and 3 show the results.

Example 3

The method described in Example 1 was performed except that a raw material mixture was prepared by adding 93.37 g (approximately 0.364 mol) of TmBPF (manufactured by Tokyo Chemical Industry Co., Ltd.), 23.34 g (approximately 0.091 mol) of BPC (manufactured by Honshu Chemical Industry Co., Ltd.), 99.97 g (approximately 0.467 mol) of DPC, and a 0.4% by mass aqueous solution of cesium carbonate as a catalyst such that the amount of cesium carbonate was 8 µmol per mole of all the dihydroxy compounds.

The polycarbonate resin thus produced was subjected to the evaluation as described above. Tables 1 and 3 show the results.

Example 4

The method described in Example 1 was performed except that a raw material mixture was prepared by adding 11.67 g (approximately 0.046 mol) of TmBPF (manufactured by Tokyo Chemical Industry Co., Ltd.), 105.04 g (approximately 0.410 mol) of BPC (manufactured by Honshu Chemical Industry Co., Ltd.), 99.97 g (approximately 0.467 mol) of DPC, and a 0.4% by mass aqueous solution of cesium carbonate as a catalyst such that the amount of cesium carbonate was 8 µmol per mole of all the dihydroxy compounds.

The polycarbonate resin thus produced was subjected to the evaluation as described above. Table 1 shows the results.

Example 5

The method described in Example 1 was performed except that a raw material mixture was prepared by adding 46.68 g (approximately 0.182 mol) of TmBPF (manufactured by Tokyo Chemical Industry Co., Ltd.), 70.03 g (approximately 0.273 mol) of BPC (manufactured by Honshu Chemical Industry Co., Ltd.), 99.97 g (approximately 0.467 mol) of DPC, and a 0.4% by mass aqueous solution of cesium carbonate as a catalyst such that the amount of cesium carbonate was 5 µmol per mole of all the dihydroxy compounds.

The polycarbonate resin thus produced was subjected to the evaluation as described above. Table 1 shows the results.

Example 6

A raw material mixture was prepared by charging a 150-ml glass reactor equipped with a reactor stirrer, a reactor heater, and a reactor pressure regulator with 27.96 g (approximately 0.115 mol) of 2,2,6,6-tetramethyl-4,4-biphenol (TmBP) (manufactured by Tokyo Chemical Industry Co., Ltd.), 88.75 g (approximately 0.3462 mol) of 2,2-bis(4-hydroxy-3-methylphenyl)propane (BPC) (manufactured by Honshu Chemical Industry Co., Ltd.), 103.33 g (approximately 0.482 mol) of diphenylcarbonate (DPC), and a 0.4% by mass aqueous solution of cesium carbonate as a catalyst such that the amount of cesium carbonate was 3 µmol per mole of all the dihydroxy compounds.

The glass reactor was then evacuated to a pressure of approximately 50 Pa (0.38 Torr) and was then filled with nitrogen to atmospheric pressure. This operation was performed three times to purge the reactor with nitrogen. After the nitrogen purge, the external temperature of the reactor was increased to 220° C. to gradually increase the internal temperature of the reactor and dissolve the mixture. The stirrer was then rotated at 100 rpm. The absolute pressure in the reactor was then reduced from 101.3 kPa (760 Torr) to 13.3 kPa (100 Torr) over 40 minutes while distilling off a by-product phenol of an oligomerization reaction between the dihydroxy compounds and DPC in the reactor.

A transesterification reaction was then performed for 80 minutes while maintaining the pressure in the reactor at 13.3 kPa and further distilling off the phenol. The external temperature of the reactor was then increased to 250° C., and the absolute pressure in the reactor was reduced from 13.3 kPa (100 Torr) to 399 Pa (3 Torr) over 40 minutes to remove the distilled phenol from the system. Furthermore, the external temperature of the reactor was increased to 285° C., and the absolute pressure in the reactor was reduced to 30 Pa (approximately 0.2 Torr) to perform a polycondensation reaction. The polycondensation reaction was completed when the reactor stirrer had a predetermined stirring power.

The reactor was then filled with nitrogen to an absolute pressure of 101.3 kPa and was pressured to a gauge pressure of 0.2 MPa. A strand of the polycarbonate resin was drawn out from the bottom of the reactor and was pelletized with a rotary cutter.

The polycarbonate resin thus produced was subjected to the evaluation as described above. Table 1 shows the results.

Example 7

The method described in Example 6 was performed except that a raw material mixture was prepared by adding 45.12 g (approximately 0.186 mol) of TmBP (manufactured by Tokyo Chemical Industry Co., Ltd.), 71.59 g (approximately 0.279 mol) of BPC (manufactured by Honshu Chemical Industry Co., Ltd.), 103.90 g (approximately 0.485 mol) of DPC, and a 0.4% by mass aqueous solution of cesium carbonate as a catalyst such that the amount of cesium carbonate was 3.2 µmol per mole of all the dihydroxy compounds.

The polycarbonate resin thus produced was subjected to the evaluation as described above. Tables 1 and 3 show the results.

Example 8

The method described in Example 6 was performed except that a raw material mixture was prepared by adding 11.09 g (approximately 0.046 mol) of TmBP (manufactured by Tokyo Chemical Industry Co., Ltd.), 93.88 g (approximately 0.366 mol) of BPC (manufactured by Honshu Chemical Industry Co., Ltd.), 11.74 g (approximately 0.046 mol) of 4,4-methylenebis(2,6-dimethylphenol) (TmBPF) (manufactured by Tokyo Chemical Industry Co., Ltd.), 101.50 g (approximately 0.474 mol) of DPC, and a 0.4% by mass aqueous solution of cesium carbonate as a catalyst such that the amount of cesium carbonate was 3 µmol per mole of all the dihydroxy compounds.

The polycarbonate resin thus produced was subjected to the evaluation as described above. Table 1 shows the results.

Example 9

The method described in Example 6 was performed except that a raw material mixture was prepared by adding 22.31 g (approximately 0.092 mol) of TmBP (manufactured by Tokyo Chemical Industry Co., Ltd.), 70.80 g (approximately 0.276 mol) of BPC (manufactured by Honshu Chemical Industry Co., Ltd.), 23.60 g (approximately 0.092 mol) of TmBPF (manufactured by Tokyo Chemical Industry Co., Ltd.), 102.06 g (approximately 0.476 mol) of DPC, and a 0.4% by mass aqueous solution of cesium carbonate as a catalyst such that the amount of cesium carbonate was 3 µmol per mole of all the dihydroxy compounds.

The polycarbonate resin thus produced was subjected to the evaluation as described above. Table 1 shows the results.

Example 10

The method described in Example 1 was performed except that a raw material mixture was prepared by adding 71.51 g (approximately 0.265 mol) of 4,4-ethylidenebis(2,6-dimethylphenol) (TmBPE), 45.20 g (approximately 0.176 mol) of BPC (manufactured by Honshu Chemical Industry Co., Ltd.), 96.79 g (approximately 0.452 mol) of DPC, and a 0.4% by mass aqueous solution of cesium carbonate as a catalyst such that the amount of cesium carbonate was 5 µmol per mole of all the dihydroxy compounds.

The polycarbonate resin thus produced was subjected to the evaluation as described above. Table 3 shows the results.

Comparative Example 1

A raw material mixture was prepared by adding 116.71 g (approximately 0.455 mol) of TmBPF (manufactured by Tokyo Chemical Industry Co., Ltd.), 99.48 g (approximately 0.464 mol) of DPC, and a 0.4% by mass aqueous solution of cesium carbonate as a catalyst such that the amount of cesium carbonate was 5 µmol per mole of all the dihydroxy compounds.

The glass reactor was then evacuated to a pressure of approximately 50 Pa (0.38 Torr) and was then filled with nitrogen to atmospheric pressure. This operation was performed three times to purge the reactor with nitrogen. After the nitrogen purge, the external temperature of the reactor was increased to 220° C. to gradually increase the internal temperature of the reactor and dissolve the mixture. The stirrer was then rotated at 100 rpm. The absolute pressure in the reactor was then reduced from 101.3 kPa (760 Torr) to 13.3 kPa (100 Torr) over 40 minutes while distilling off a by-product phenol of an oligomerization reaction between the dihydroxy compounds and DPC in the reactor.

A transesterification reaction was then performed for 80 minutes while maintaining the pressure in the reactor at 13.3 kPa and further distilling off the phenol. The external temperature of the reactor was then increased to 250° C., and the absolute pressure in the reactor was reduced from 13.3 kPa (100 Torr) to 399 Pa (3 Torr) over 40 minutes to remove the distilled phenol from the system. The external temperature of the reactor was then increased to 285° C. The reaction solution crystallized, and the reaction was difficult to continue and was stopped.

In Comparative Example 1, the use of only TmBPF caused crystallization and could not produce the polymer. Thus, the evaluation described above was not performed.

Comparative Example 2

The method described in Example 1 was performed except that a raw material mixture was prepared by adding 61.73 g (approximately 0.241 mol) of TmBPF (manufactured by Tokyo Chemical Industry Co., Ltd.), 54.98 g (approximately 0.241 mol) of 2,2-bis(4-hydroxyphenyl)propane (hereinafter sometimes abbreviated to "BPA"), 108.34 g (approximately 0.506 mol) of DPC, and a 0.4% by mass aqueous solution of cesium carbonate as a catalyst such that the amount of cesium carbonate was 3 µmol per mole of all the dihydroxy compounds.

The polycarbonate resin thus produced was subjected to the evaluation as described above. Table 2 shows the results.

Comparative Example 3

The method described in Example 1 was performed except that a raw material mixture was prepared by adding 100.00 g (approximately 0.390 mol) of BPC (manufactured by Honshu Chemical Industry Co., Ltd.), 86.08 g (approximately 0.402 mol) of DPC, and a 0.4% by mass aqueous solution of cesium carbonate as a catalyst such that the amount of cesium carbonate was 4.5 µmol per mole of all the dihydroxy compounds.

The polycarbonate resin thus produced was subjected to the evaluation as described above. Tables 2 and 3 show the results.

Comparative Example 4

The method described in Example 1 was performed except that a raw material mixture was prepared by adding 116.71 g (approximately 0.511 mol) of BPA, 117.18 g (approximately 0.547 mol) of DPC, and a 0.04% by mass aqueous solution of cesium carbonate as a catalyst such that the amount of cesium carbonate was 0.5 µmol per mole of all the dihydroxy compounds.

The polycarbonate resin thus produced was subjected to the evaluation as described above. Tables 2 and 3 show the results.

Comparative Example 5

The method described in Example 1 was performed except that a raw material mixture was prepared by adding 116.71 g (approximately 0.410 mol) of 2,2-bis(4-hydroxy-3,5-dimethylphenyl)propane (hereinafter sometimes abbreviated to "TmBPA") (manufactured by Honshu Chemical Industry Co., Ltd.), 88.79 g (approximately 0.414 mol) of DPC, and a 0.4% by mass aqueous solution of cesium carbonate as a catalyst such that the amount of cesium carbonate was 5 μmol per mole of all the dihydroxy compounds.

The polycarbonate resin thus produced was subjected to the evaluation as described above. Tables 2 and 3 show the results.

Comparative Example 6

The method described in Example 1 was performed except that a raw material mixture was prepared by adding 25.34 g (approximately 0.089 mol) of TmBPA (manufactured by Honshu Chemical Industry Co., Ltd.), 91.37 g (approximately 0.356 mol) of TmBPF (manufactured by Tokyo Chemical Industry Co., Ltd.), 97.83 g (approximately 0.457 mol) of DPC, and a 0.4% by mass aqueous solution of cesium carbonate as a catalyst such that the amount of cesium carbonate was 8 μmol per mole of all the dihydroxy compounds.

The polycarbonate resin thus produced was subjected to the evaluation as described above. Table 2 shows the results.

Comparative Example 7

The method described in Example 1 was performed except that a raw material mixture was prepared by adding 61.38 g (approximately 0.216 mol) of TmBPA (manufactured by Honshu Chemical Industry Co., Ltd.), 55.33 g (approximately 0.216 mol) of BPC (manufactured by Honshu Chemical Industry Co., Ltd.), 95.71 g (approximately 0.447 mol) of DPC, and a 0.4% by mass aqueous solution of cesium carbonate as a catalyst such that the amount of cesium carbonate was 2 μmol per mole of all the dihydroxy compounds.

The polycarbonate resin thus produced was subjected to the evaluation as described above. Tables 2 and 3 show the results.

Comparative Example 8

The method described in Example 1 was performed except that a raw material mixture was prepared by adding 54.98 g (approximately 0.241 mol) of BPA (manufactured by Honshu Chemical Industry Co., Ltd.), 61.73 7 (approximately 0.241 mol) of BPC (manufactured by Honshu Chemical Industry Co., Ltd.), 107.82 g (approximately 0.503 mol) of DPC, and a 0.4% by mass aqueous solution of cesium carbonate as a catalyst such that the amount of cesium carbonate was 3 μmol per mole of all the dihydroxy compounds.

The polycarbonate resin thus produced was subjected to the evaluation as described above. Tables 2 and 3 show the results.

TABLE 1

| | | | Example | | | | | | | | |
|---|---|---|---|---|---|---|---|---|---|---|---|
| | | | 1 | 2 | 3 | 4 | 5 | 6 | 7 | 8 | 9 |
| Raw material dihydroxy compound component ratio [mol %] | Aromatic dihydroxy compound from which repeating unit (A) was derived | BPC | 80 | 60 | 20 | 10 | 60 | 75 | 60 | 80 | 60 |
| | Aromatic dihydroxy compound from which repeating unit (B') was derived | TmBPF | 20 | 40 | 80 | 90 | 40 | — | — | 10 | 20 |
| | | TmBP | — | — | — | — | — | 25 | 40 | 10 | 20 |
| | Aromatic dihydroxy compound from which another repeating unit was derived | TmBRA | — | — | — | — | — | — | — | — | — |
| | | BPA | — | — | — | — | — | — | — | — | — |
| Viscosity-average molecular weight (Mv) | | — | 28400 | 23600 | 20400 | 17200 | 14800 | 24000 | 23200 | 24400 | 23400 |
| Heat resistance | T | °C. | 133 | 143 | 167 | 168 | 142 | 143 | 160 | 137 | 152 |
| Surface hardness | Pencil hardness | — | 2H | 2H | H | H | 2H | 2H | 2H | 2H | 2H |
| Impact resistance | 5-time impact test, number of broken specimens (out of 5 specimens) | — | 0 | 0 | 0 | 0 | 1 | 1 | 0 | 0 | 0 |
| Alkali resistance | | — | S | S | S | S | A | S | S | S | S |

TABLE 2

| | | | Comparative Example | | | | | | | |
|---|---|---|---|---|---|---|---|---|---|---|
| | | | 1 | 2 | 3 | 4 | 5 | 6 | 7 | 8 |
| Raw material dihydroxy compound component | Aromatic dihydroxy compound from which repeating unit (A) was derived | BPC | — | — | 100 | — | — | — | 50 | 50 |

TABLE 2-continued

|  |  |  | Comparative Example | | | | | | | |
|---|---|---|---|---|---|---|---|---|---|---|
|  |  |  | 1 | 2 | 3 | 4 | 5 | 6 | 7 | 8 |
| ratio [mol %] | Aromatic dihydroxy compound from which repeating unit (B') was derived | TmBFF | 100 | 50 | — | — | — | 80 | — | — |
|  |  | TmBP | — | — | — | — | — | — | — | — |
|  | Aromatic dihydroxy compound from which another repeating unit was derived | TmBPA | — | — | — | — | 100 | 20 | 50 | — |
|  |  | BPA | — | 50 | — | 100 | — | — | — | 50 |
| Viscosity-average molecular weight (Mv) |  | — | — | 21900 | 26200 | 21000 | 23000 | 19000 | 20900 | 21900 |
| Heat resistance | Tg | ° C. | — | 162 | 120 | 145 | 193 | 182 | 157 | 133 |
| Surface hardness | Pencil hardness | — | — | HB | 2H | 2-3B | H | F | 2H | H |
| Impact resistance | 5-time impact test, number of broken specimens (out of 5 specimens) | — | — | 0 | 4 | 0 | 5 | 3 | 5 | 0 |
| Alkali resistance |  | — | — | A | A | c | S | S | S | B |

TABLE 3

|  |  |  | Example | | | | Comparative Example | | | | | |
|---|---|---|---|---|---|---|---|---|---|---|---|---|
|  |  |  | 2 | 3 | 7 | 10 | 1 | 3 | 4 | 5 | 7 | 8 |
| Raw material dihydroxy compound component ratio [mol %] | Aromatic dihydroxy compound from which repeating unit (A) was derived | BPC | 60 | 20 | 60 | 40 | — | 100 | — | — | 50 | 50 |
|  | Aromatic dihydroxy compound from which repeating unit (B) was derived | TmBPF | 40 | 80 | — | — | 100 | — | — | — | — | — |
|  |  | TmBPE | — | — | — | 60 | — | — | — | — | — | — |
|  |  | TmBP | — | — | 40 | — | — | — | — | — | — | — |
|  | Aromatic dihydroxy compound from which another repeating unit was derived | TmBPA | — | — | — | — | — | — | — | 100 | 50 | — |
|  |  | BPA | — | — | — | — | — | — | 100 | — | — | 50 |
| Viscosity-average molecular weight (Mv) |  | — | 23600 | 20400 | 23200 | 24200 | — | 26200 | 21000 | 23000 | 20900 | 21900 |
| Heat resistance | Tg | ° C. | 143 | 167 | 160 | 161 | — | 120 | 145 | 193 | 157 | 133 |
| Dielectric properties | Relative dielectric constant ($\varepsilon_r$) | — | 2.486 | 2.421 | 2.422 | 2.411 | — | 2.466 | 2.561 | 2.335 | 2.427 | 2.524 |
|  | Dielectric loss tangent (tan$\delta$) | ×10−3 | 0.94 | 1.76 | 1.95 | 2.02 | — | 1.55 | 5.39 | 2.27 | 1.48 | 2.60 |
| Flame retardancy | UL94/0.8 mmt | — | V-0 | V-0 | V-2 | V-2 | — | V-2 | V-2 | V-2 | V-2 | V-2 |
|  | Longest time to ignite marking cotton | s | — | — | 19 | 12 | — | 8 | 7 | 6 | 7 | 7 |
| Impact resistance | 5-time impact test, number of broken specimens (out of 5 specimens) | — | 0 | 0 | 0 | 0 | — | 4 | 0 | 5 | 5 | 0 |

Discussion

These results show the following.

Examples 1 to 4 and Examples 7 to 9 have no breakage in the 5-time impact test and have high impact resistance.

Comparative Example 4 has high impact resistance but lower pencil hardness and alkali resistance than Examples 1 to 4 and Examples 7 to 9. Comparative Example 2 also has high impact resistance but lower alkali resistance and pencil hardness than Examples 1 to 4 and Examples 7 to 9.

Examples 5 and 6 have slightly lower impact resistance than Examples 1 to 4 and Examples 7 to 9 but have very high pencil hardness and high alkali resistance.

Comparative Examples 2 and 4 have high impact resistance but lower pencil hardness than Examples 5 and 6.

A polymer could not be produced in Comparative Example 1 due to crystallization during polymerization.

Comparative Example 3 has high pencil hardness but lower impact resistance, a lower Tg, and consequently lower heat resistance than Examples 1 to 9.

Comparative Examples 5 and 7 have high pencil hardness and alkali resistance but much lower impact resistance than Examples 1 to 9.

Comparative Example 6 has high alkali resistance but lower pencil hardness and impact resistance than Examples 1 to 9.

The polycarbonate resins of Examples 2 and 3 with the repeating unit (A) (derived from BPC) and the repeating unit (B') or (B) (derived from TmBPF) have a lower relative dielectric constant and a lower dielectric loss tangent than Comparative Example 4, have higher heat resistance, a lower relative dielectric constant, and a lower dielectric loss tangent than Comparative Example 8, and have almost the same dielectric properties and heat resistance as and much higher flame retardancy than Comparative Example 7.

Examples 7 and 10 have higher heat resistance, flame retardancy, and impact resistance than Comparative Example 3, have higher heat resistance, better dielectric properties, and higher flame retardancy than Comparative Example 4, and have much higher flame retardancy and impact resistance than Comparative Example 5. Examples 7 and 10 have higher flame retardancy and impact resistance than Comparative Example 7. Examples 7 and 10 have much higher heat resistance, better dielectric properties, and higher flame retardancy than Comparative Example 8.

Comparative Example 1 has difficulty in forming due to crystallization and cannot be used as a housing for a communication device with a built-in microwave and/or millimeter-wave antenna.

Examples 1 to 10 can be injection-molded with a typical injection molding machine without problems and have high fluidity and forming processability.

These results show that the polycarbonate resins according to Examples 1 to 10, which are polycarbonate resin compositions according to the present invention, have higher surface hardness and alkali resistance as well as higher heat resistance, impact resistance, and fluidity than the polycarbonate resins according to Comparative Examples 1 to 8.

Furthermore, the polycarbonate resins of Examples 2 and 3, which are the polycarbonate resins according to the first invention, have good dielectric properties as well as high heat resistance and flame retardancy and are suitable for use in a housing for a communication device with a built-in microwave and/or millimeter-wave antenna.

Although the present invention has been described in detail with reference to particular embodiments, it will be apparent to those skilled in the art that various modifications may be made therein without departing from the spirit and scope of the present invention.

The present application is based on Japanese Patent Application No. 2019-157059 filed Aug. 29, 2019, Japanese Patent Application No. 2020-101649 filed Jun. 11, 2020, and Japanese Patent Application No. 2020-122968 filed Jul. 17, 2020, which are incorporated herein by reference in their entirety.

The invention claimed is:

1. A thermoplastic resin composition comprising a polycarbonate resin with a repeating unit (A) represented by formula (1) and a repeating unit (B') represented by formula (2'):

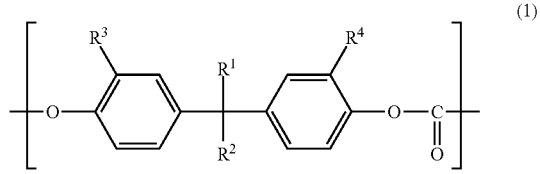

wherein in formula (1), $R^1$ and $R^2$ independently denote a hydrogen atom, a substituted or unsubstituted alkyl group having 1 to 20 carbon atoms, or a substituted or unsubstituted aryl group, the alkyl groups in $R^1$ and $R^2$ may be bonded together to form a ring, and $R^3$ and $R^4$ independently denote a substituted or unsubstituted alkyl group having 1 to 20 carbon atoms or a substituted or unsubstituted aryl group, and

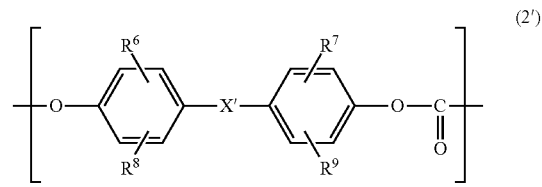

wherein in formula (2'), X' denotes a single bond or an unsubstituted methylene group, and $R^6$ to $R^9$ independently denote a substituted or unsubstituted alkyl group having 1 to 20 carbon atoms or a substituted or unsubstituted aryl group.

2. The thermoplastic resin composition according to claim 1, wherein $R^1$ and $R^2$ in formula (1) independently denote a methyl group, or the alkyl groups in $R^1$ and $R^2$ are bonded together to form a ring represented by formula (1a) or (1b)

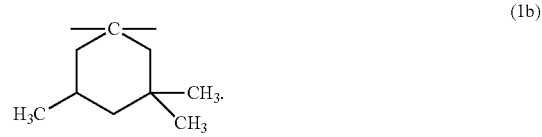

3. The thermoplastic resin composition according to claim 1, wherein $R^3$ and $R^4$ in formula (1) independently denote a methyl group.

4. The thermoplastic resin composition according to claim 1, wherein the repeating unit (B') is a repeating unit represented by formula (2A'),

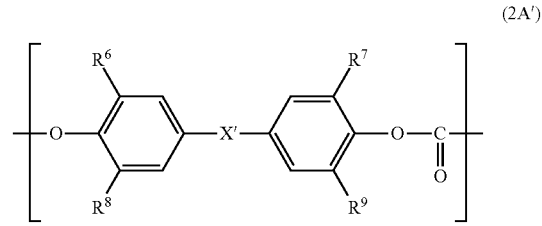

wherein X' and $R^6$ to $R^9$ in formula (2A') have the same meaning as in formula (2').

5. The thermoplastic resin composition according to claim 1, wherein the repeating unit (B') is a repeating unit represented by formula (2B'),

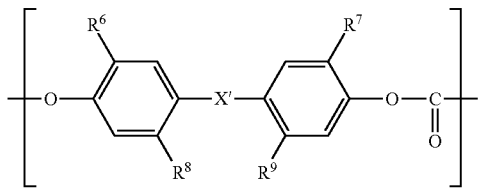
(2B')

wherein X' and R⁶ to R⁹ in formula (2B') have the same meaning as in formula (2').

6. The thermoplastic resin composition according to claim 1, wherein $R^6$ to $R^9$ in formula (2') independently denote a methyl group.

7. The thermoplastic resin composition according to claim 1, wherein the repeating unit (A) and the repeating unit (B') in the polycarbonate resin have a repeating unit (A):repeating unit (B') ratio in the range of 1:99 to 99:1 on a molar basis.

8. The thermoplastic resin composition according to claim 1, wherein a sum of the repeating unit (A) and the repeating unit (B') in the polycarbonate resin constitutes 50% or more by mole of a total carbonate structural unit of the polycarbonate resin.

9. The thermoplastic resin composition according to claim 1, wherein the polycarbonate resin has a glass transition temperature of 125° C. or more.

10. The thermoplastic resin composition according to claim 1, wherein the thermoplastic resin composition contains 50% or more by mass of the polycarbonate resin.

11. The thermoplastic resin composition according to claim 1, comprising the polycarbonate resin as a copolymerized polycarbonate resin of the repeating unit (A) and the repeating unit (B').

12. The thermoplastic resin composition according to claim 1, comprising the polycarbonate resin as a blend of a polycarbonate resin with the repeating unit (A) and a polycarbonate resin with the repeating unit (B').

13. The thermoplastic resin composition according to claim 1, wherein the polycarbonate resin has a viscosity-average molecular weight (Mv) in the range of 14,500 to 30,000.

14. The thermoplastic resin composition according to claim 13, wherein the polycarbonate resin has a viscosity-average molecular weight (Mv) in the range of 18,000 to 28,000.

15. The thermoplastic resin composition according to claim 1, wherein pencil hardness measured by a method according to ISO 15184 is H or higher.

16. A formed product produced by using a thermoplastic resin composition comprising a polycarbonate resin with a repeating unit (A) represented by formula (1) and a repeating unit (B) represented by formula (2):

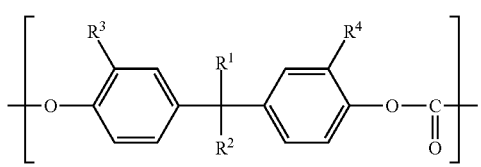
(1)

wherein in formula (1), $R^1$ and $R^2$ independently denote a hydrogen atom, a substituted or unsubstituted alkyl group having 1 to 20 carbon atoms, or a substituted or unsubstituted aryl group, the alkyl groups in $R^1$ and $R^2$ may be bonded together to form a ring, and $R^3$ and $R^4$ independently denote a substituted or unsubstituted alkyl group having 1 to 20 carbon atoms or a substituted or unsubstituted aryl group, and

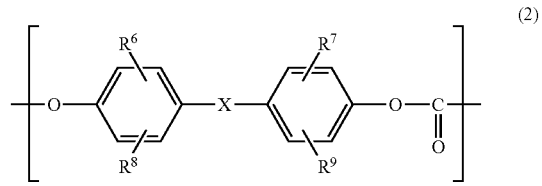
(2)

wherein in formula (2), X denotes a single bond or a divalent organic group represented by formula (3), and $R^6$ to $R^9$ independently denote a substituted or unsubstituted alkyl group having 1 to 20 carbon atoms or a substituted or unsubstituted aryl group, and

(3)

wherein in formula (3), $R^5$ denotes a hydrogen atom, a substituted or unsubstituted alkyl group having 1 to 20 carbon atoms, or a substituted or unsubstituted aryl group.

17. The formed product according to claim 16, wherein $R^1$ and $R^2$ in formula (1) independently denote a methyl group, or the alkyl groups in $R^1$ and $R^2$ are bonded together to form a ring represented by formula (1a) or (1b)

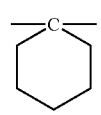
(1a)

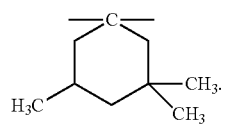
(1b)

18. The formed product according to claim 16, wherein $R^3$ and $R^4$ in the general formula (1) independently denote a methyl group.

19. The formed product according to claim 16, wherein the repeating unit (B) is a repeating unit represented by formula (2A),

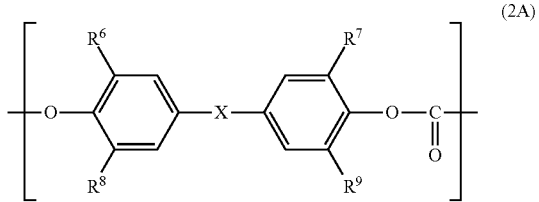

wherein X and $R^6$ to $R^9$ in formula (2A) have the same meaning as in formula (2).

20. The formed product according to claim 16, wherein the repeating unit (B) is a repeating unit represented by formula (2B),

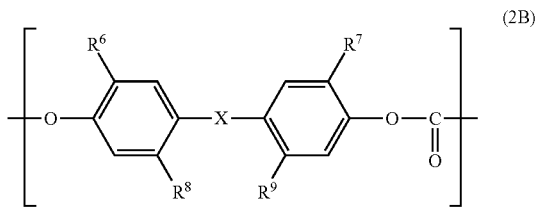

wherein X and $R^6$ to $R^9$ in formula (2B) have the same meaning as in formula (2).

21. The formed product according to claim 16, wherein $R^6$ to $R^9$ in formula (2) independently denote a methyl group.

22. The formed product according to claim 16, wherein $R^5$ in formula (3) denotes a hydrogen atom or a methyl group.

23. The formed product according to claim 16, wherein the repeating unit (A) and the repeating unit (B) in the polycarbonate resin have a repeating unit (A):repeating unit (B) ratio in the range of 1:99 to 99:1 on a molar basis.

24. The formed product according to claim 16, wherein a sum of the repeating unit (A) and the repeating unit (B) in the polycarbonate resin constitutes 50% or more by mole of a total carbonate structural unit of the polycarbonate resin.

25. The formed product according to claim 16, wherein the polycarbonate resin has a glass transition temperature of 125° C. or more.

26. The formed product according to claim 16, wherein the thermoplastic resin composition contains 50% or more by mass of the polycarbonate resin.

27. The formed product according to claim 16, wherein the formed product is an extrudate or an injection-molded product.

28. The formed product according to claim 27, wherein the extrudate is a sheet or film.

29. A housing for a communication device with a built-in microwave and/or millimeter-wave antenna, produced by using the formed product according to claim 16.

30. The housing for a communication device according to claim 29, wherein the antenna is used for a radio wave in a frequency band in the range of 3.5 to 30 GHz.

31. The housing for a communication device according to claim 29, wherein the communication device is a notebook computer, a tablet device, a smartphone, or a router.

32. A communication device with a built-in microwave and/or millimeter-wave antenna, produced by using the housing for a communication device according to claim 29.

* * * * *